(12) United States Patent
Lee et al.

(10) Patent No.: US 8,537,788 B2
(45) Date of Patent: Sep. 17, 2013

(54) APPARATUS AND METHOD OF TRANSMITTING ACK/NACK INFORMATION AND APPARATUS AND METHOD OF RECEIVING ACK/NACK INFORMATION

(75) Inventors: Moon Il Lee, Yongin-si (KR); Jae Hoon Chung, Yongin-si (KR); Hyun Soo Ko, Seoul (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 13/032,605

(22) Filed: Feb. 22, 2011

(65) Prior Publication Data

US 2011/0206014 A1 Aug. 25, 2011

Related U.S. Application Data

(60) Provisional application No. 61/306,923, filed on Feb. 22, 2010, provisional application No. 61/310,666, filed on Mar. 4, 2010, provisional application No. 61/317,290, filed on Mar. 25, 2010.

(30) Foreign Application Priority Data

Feb. 10, 2011 (KR) ................. 10-2011-0011804

(51) Int. Cl.
*H04B 1/707* (2011.01)
(52) U.S. Cl.
USPC ........... 370/335; 370/229; 370/230; 370/231; 370/232; 370/235; 370/236; 370/236.2; 370/329; 370/341; 370/338; 714/18; 714/748; 714/749; 714/750; 714/751

(58) Field of Classification Search
None
See application file for complete search history.

(56) References Cited

U.S. PATENT DOCUMENTS

| 8,245,092 B2* | 8/2012 | Kotecha et al. ............... 714/748 |
| 2009/0262856 A1* | 10/2009 | Onggosanusi et al. ....... 375/267 |
| 2010/0002630 A1* | 1/2010 | Park et al. ..................... 370/328 |
| 2010/0329220 A1* | 12/2010 | Kim et al. ..................... 370/336 |
| 2011/0085513 A1* | 4/2011 | Chen et al. .................... 370/330 |

(Continued)

FOREIGN PATENT DOCUMENTS

| EP | 2234308 A1 * | 9/2010 |
| WO | WO 2008/130189 | * 10/2008 |
| WO | WO 2010/107232 | * 9/2010 |

OTHER PUBLICATIONS

ESTI TS 136.213. LTE, Evolved Universal Terrestrial Radio Access (E-UTRA), Physical layer procedures. Oct. 2009. ETSI. V.8.8.0. All Pages.*

(Continued)

*Primary Examiner* — Joseph Avellino
*Assistant Examiner* — Tsung Wu
(74) *Attorney, Agent, or Firm* — Lee, Hong, Degerman, Kang & Waimey

(57) ABSTRACT

An apparatus and method of transmitting ACK/NACK (acknowledgement/negative ACK) information in downlink and an apparatus and method of receiving the ACK/NACK information are disclosed. The present invention configures ACK/NACK information on multiple UL codeword transmission using a PHICH and at least one NDI, whereby the ACK/NACK information on the multiple UL codeword transmission is transmitted to a user equipment without additional PHICH resource allocation. The present invention extends the conventional HI codeword and/or arranged position on a signal constellation, thereby transmitting ACK/NACK information on multiple UL codeword transmission to a user equipment without additional PHICH resource allocation.

12 Claims, 20 Drawing Sheets

(56) References Cited

U.S. PATENT DOCUMENTS

| | | | |
|---|---|---|---|
| 2011/0283157 A1* | 11/2011 | Yang et al. | 714/749 |
| 2012/0057451 A1* | 3/2012 | Kim et al. | 370/216 |
| 2012/0093082 A1* | 4/2012 | Kim et al. | 370/328 |
| 2012/0147815 A1* | 6/2012 | Meyer et al. | 370/328 |

OTHER PUBLICATIONS

ETSI TS 136.300. LTE, Evolved Universal Terrestrial Radio Access (E-UTRA) and Evolved Universal Terrestrial Radio Access Network (E-UTRAN), overall description, Stage 2. Jul. 2009. ETSI. V.8.9.0. All Pages.*

Kim et al. Downlink Control Information Format for Uplink MIMO Transmission. U.S. Appl. No. 61/252,150, filed Oct. 15, 2009. All Pages.*

Kim et al. Downlink Control Information Format for Uplink MIMO Transmission. U.S. Appl. No. 61/224,065, filed Jul. 9, 2009. All Pages.*

Kim et al. MCS and HARQ Related Signaling for MIMO Support. U.S. Appl. No. 61/181,291, filed May 27, 2009. All Pages.*

Kim et al. Retransmission Method for Supporting Multiple Input Multiple Output in Synchronous HARQ. U.S. Appl. No. 61/160,344, filed Mar. 16, 2009. All Pages.*

ETSI TS 136.212. LTE, Evolved Universal Terrestrial Radio Access (E-UTRA), Multiplexing and channel coding. Jun. 2009. 3GPP. version 8.7.0. All pages.*

\* cited by examiner (a)                                (b)

FIG. 21
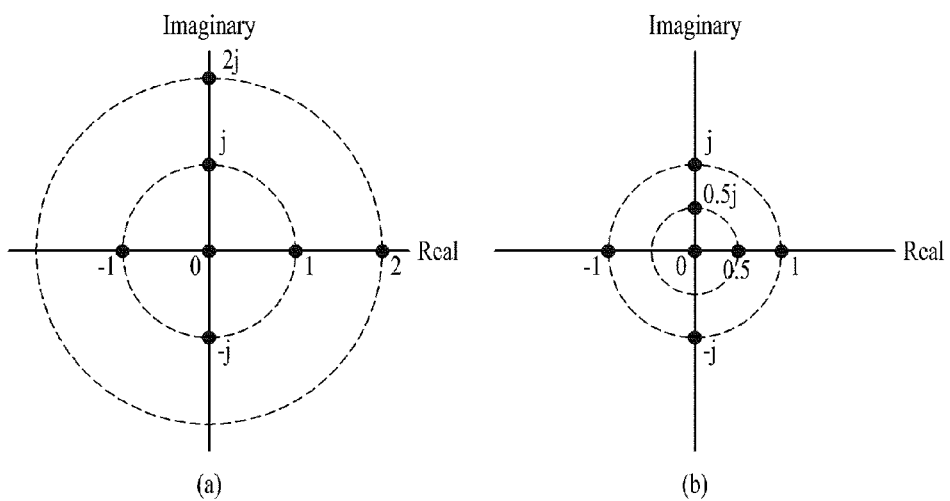
(a)  (b)
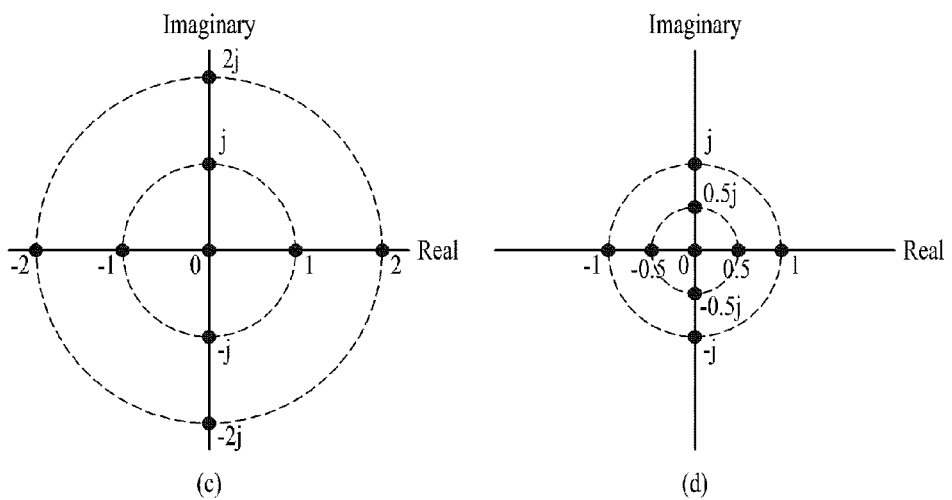
(c)  (d)

APPARATUS AND METHOD OF TRANSMITTING ACK/NACK INFORMATION AND APPARATUS AND METHOD OF RECEIVING ACK/NACK INFORMATION

CROSS-REFERENCE TO RELATED APPLICATIONS

Pursuant to 35 U.S.C. §119, this application claims the benefit of earlier filing date and right of priority to Korean Application No. 10-2011-0011804, filed on Feb. 10, 2011, and U.S. Provisional Application Ser. Nos. 61/306,923, filed on Feb. 22, 2010, 61/310,666, filed on Mar. 4, 2010, and 61/317,290, filed on Mar. 25, 2010, the contents of which are incorporated by reference herein in their entirety.

BACKGROUND OF THE INVENTION

1. Field of the Invention

The present invention relates to wireless communications, and more particularly, to an apparatus and method of transmitting ACK/NACK (acknowledgement/negative ACK) information in downlink and an apparatus and method of receiving the ACK/NACK information.

2. Discussion of the Related Art

Recently, wireless communication systems are widely developed to provide various kinds of communication services including audio communications, data communications and the like. Generally, a wireless communication system is a kind of a multiple access system capable of supporting communications with multiple users by sharing available system resources (e.g., bandwidth, transmission power, etc.). For instance, multiple access systems include CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

SUMMARY OF THE INVENTION

Accordingly, the present invention is directed to an apparatus and method of transmitting ACK/NACK (acknowledgement/negative ACK) information in downlink and an apparatus and method of receiving the ACK/NACK information that substantially obviate one or more problems due to limitations and disadvantages of the related art.

An object of the present invention is to provide an apparatus and method of transmitting downlink ACK/NACK efficiently.

Another object of the present invention is to provide a method and apparatus for transmitting ACK/NACK information on a plurality of codewords using a single PHICH resource.

Another object of the present invention is to provide an apparatus and method of performing an uplink retransmission for at least one of a plurality of codewords in response to a downlink ACK/NACK.

Another object of the present invention is to provide an apparatus and method of receiving ACK/NACK information on a plurality of codewords via a single PHICH resource.

A further object of the present invention is to provide an apparatus and method of performing an uplink retransmission for at least one of a plurality of codewords based on ACK/NACK information, which are received via a single PHICH resource, on a plurality of the codewords.

It is to be understood that technical objects to be achieved by the present invention are not limited to the aforementioned technical objects and other technical objects which are not mentioned will be apparent from the following description to the person with an ordinary skill in the art to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of receiving ACK/NACK (acknowledgement/negative ACK) information, which is received by a user equipment from a base station in a wireless communication system, according to the present invention includes the steps of transmitting a plurality of codewords to the base station via a prescribed frequency resource, receiving a PHICH (physical hybrid ARQ channel) for a plurality of the codewords from the base station, if the PHICH indicates NACK, retransmitting a plurality of the codewords to the base station, receiving a plurality of new data indicators (NDIs) respectively corresponding to a plurality of the codewords from the base station, and retransmitting the codeword, to which the corresponding NDI is not toggled, among a plurality of the codewords to the base station.

In another aspect of the present invention, a method of receiving ACK/NACK (acknowledgement/negative ACK) information, which is received by a user equipment from a base station in a wireless communication system, includes the steps of transmitting two codewords to the base station via a prescribed frequency resource, receiving a PHICH (physical hybrid ARQ channel) for the two codewords from the base station, and determining ACK/NACK for each of the two codewords based on a position on a signal constellation of the PHICH, wherein the PHICH indicates at least one of a status that both of the codewords are NACK, a status that the second codeword is NACK, and a status that both of the codewords are ACK and wherein the statuses correspond to different positions on the signal constellation, respectively.

In another aspect of the present invention, in receiving ACK/NACK (acknowledgement/negative ACK) information from a base station in a wireless communication system, a user equipment includes a transmitter configured to transmit a plurality of codewords to the base station via a prescribed frequency resource, a receiver, and a processor configured to control the transmitter and the receiver, the processor configured to control the receiver to receive a PHICH (physical hybrid ARQ channel) for a plurality of the codewords from the base station, the processor, if the PHICH indicates NACK, configured to control the transmitter to retransmit a plurality of the codewords to the base station, the processor configured to control the receiver to receive a plurality of new data indicators (NDIs) respectively corresponding to a plurality of the codewords from the base station, the processor configured to control the transmitter to retransmit the codeword, to which the corresponding NDI is not toggled, among a plurality of the codewords to the base station.

In another aspect of the present invention, in receiving ACK/NACK (acknowledgement/negative ACK) information from a base station in a wireless communication system, a user equipment includes a transmitter configured to transmit two codewords to the base station via a prescribed frequency resource, a receiver, and a processor configured to control the transmitter and the receiver, the processor configured to control the receiver to receive a PHICH (physical hybrid ARQ channel) for the two codewords from the base station, the processor configured to determine ACK/NACK for each of the two codewords based on a position on a signal constellation of the PHICH, wherein the PHICH indicates at least one of a status that both of the codewords are NACK, a status that the second codeword is NACK, and a status that both of the codewords are ACK and wherein the statuses correspond to different positions on the signal constellation, respectively.

In another aspect of the present invention, a method of transmitting ACK/NACK (acknowledgement/negative ACK) information, which is transmitted to a user equipment from a base station in a wireless communication system, includes the steps of receiving a plurality of codewords from the user equipment via a prescribed frequency resource, determining ACK or NACK for each of a plurality of the codewords, and generating a PHICH (physical hybrid ARQ channel) for a plurality of the codewords based on a result of the determining step, transmitting the PHICH to the user equipment, or transmitting a new data indicator (NDI) corresponding to the codeword determined as the NACK among a plurality of the codewords without toggling the new data indicator based on the result of the determining step, wherein the PHICH indicates that a plurality of the codewords are NACK or ACK.

In another aspect of the present invention, a method of transmitting ACK/NACK (acknowledgement/negative ACK) information, which is transmitted to a user equipment from a base station in a wireless communication system, includes the steps of receiving two codewords from the user equipment via a prescribed frequency resource, determining ACK or NACK for each of the two codewords, generating a PHICH (physical hybrid ARQ channel) for the two codewords from the user equipment based on a result of the determining step, and arranging the PHICH at one position on a signal constellation, wherein the PHICH indicates at least one of a status that both of the codewords are NACK, a status that the second codeword is NACK, and a status that both of the codewords are ACK and wherein the statuses correspond to different positions on the signal constellation, respectively.

In another aspect of the present invention, in transmitting ACK/NACK (acknowledgement/negative ACK) information to a user equipment in a wireless communication system, a base station includes a receiver configured to receive a plurality of codewords from the user equipment via a prescribed frequency resource, a transmitter, and a processor configured to control the transmitter and the receiver, the processor configured to determine ACK or NACK for each of a plurality of the codewords, the processor controlling the transmitter to generate a PHICH (physical hybrid ARQ channel) for a plurality of the codewords based on a result of the determination, the processor controlling the transmitter to transmit the PHICH to the user equipment, or the processor controlling the transmitter to transmit a new data indicator (NDI) corresponding to the codeword determined as the NACK among a plurality of the codewords without toggling the new data indicator based on the determination, wherein the PHICH indicates that a plurality of the codewords are NACK or ACK.

In a further aspect of the present invention, in transmitting ACK/NACK (acknowledgement/negative ACK) information to a user equipment in a wireless communication system, a base station includes a receiver configured to receive two codewords from the user equipment via a prescribed frequency resource, a transmitter, and a processor configured to control the transmitter and the receiver, the processor config- ured to determine ACK or NACK for each of the two codewords, the processor configured to generate PHICH (physical hybrid ARQ channel) for the two codewords based on a result of the determination, the processor configured to arrange the PHICH at one position on a signal constellation, wherein the PHICH indicates at least one of a status that both of the codewords are NACK, a status that the second codeword is NACK, and a status that both of the codewords are ACK and wherein the statuses correspond to different positions on the signal constellation, respectively.

Accordingly, the present invention provides the following effects and/or advantages.

First of all, the present invention enables downlink ACK/NACK to be efficiently transmitted or received in a wireless communication system.

Secondly, the present invention enables ACK/NACK information on a plurality of codewords to be transmitted or received in a wireless communication using a single PHICH resource.

The aforementioned technical solutions are only a part of the embodiments of the present invention, and various modifications to which technical features of the present invention are applied could be understood by the person with ordinary skill in the art to which the present invention pertains, based on the following detailed description of the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 20 to 22 are diagrams for examples of PHICH constellation for representing PHICH statuses more than 2.

DETAILED DESCRIPTION OF THE INVENTION

Figure 1:
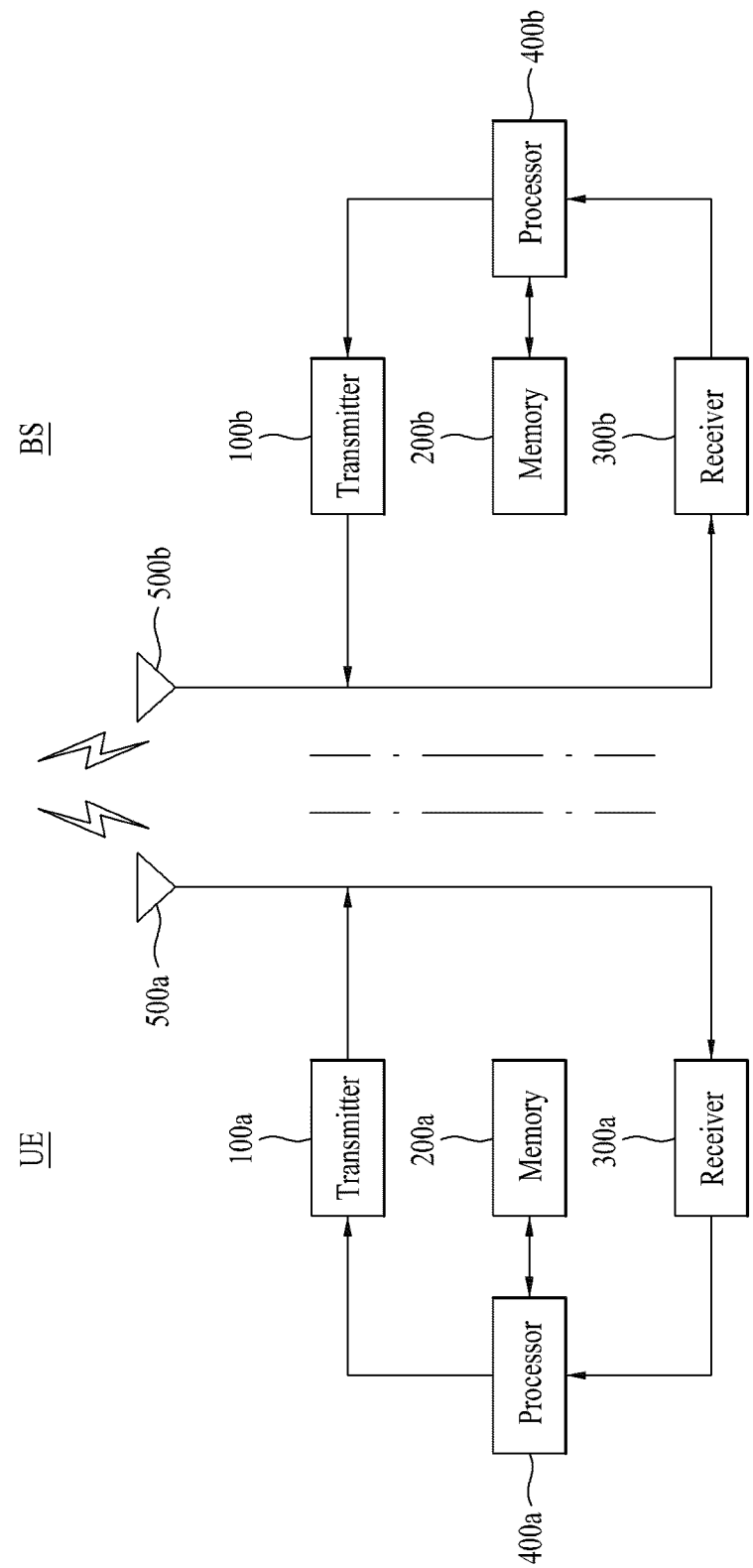
FIG. 1 is a block diagram of components of a user equipment (UE) and a base station for implementing the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) denotes a mobile or fixed type user terminal. Examples of the UE include various equipments that transmit and receive user data and/or various kinds of control information to and from a base station. The UE may be referred to as, a terminal equipment (TE), a mobile station (MS), a mobile terminal (MT), a user terminal (UT), a subscriber station (SS), a wireless device, a personal digital assistant (PDA), a wireless modem, or a handheld device. Also, in the present invention, a base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

Hereinafter, PDCCH/PCFICH/PHICH/PDSCH/DRS/CRS/DMRS/CSI-RS RE represents an RE assigned to or available for PDCCH/PCFICH/PHICH/PDSCH/DRS/CRS/DMRS/CSI-RS. In particular, a resource element (RE) carrying a reference signal shall be named RS RE and a resource element (RE) carrying control information or data shall be named data RE.

Meanwhile, in the present invention, if a specific signal is allocated to frame/subframe/slot/symbol/carrier/subcarrier, it means that the specific signal is transmitted through the corresponding carrier/subcarrier during a period/timing of the corresponding frame/subframe/slot/symbol.

Meanwhile, a cell mentioned in the present invention indicates a predetermined geographical area to which a single base station or a single antenna group provides a communication service. Therefore, communication with a specific cell in the present invention may mean a communication with an antenna group providing a communication service to the specific cell. And, a downlink/uplink (DL/UL) signal of a specific cell means a DL/UL signal for an antenna group providing a communication service to the specific cell. Moreover, a channel status/quality of a specific cell means a channel status/quality of a channel or communication link established between an antenna group providing a communication service to the specific cell and a prescribed UE.

FIG. 1 is a block diagram illustrating a user equipment and a base station for implementing the present invention.

The user equipment (UE) serves as a transmitting apparatus on the uplink and as a receiving apparatus on the downlink. By contrast, the base station (BS) may serve as a receiving apparatus on the uplink and as a transmitting apparatus on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components by separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a radio frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b can be referred as antenna ports. Each antenna port can correspond to one physical antenna or can be configured by a combination of more than one physical antenna. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be achieved by hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected with the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output informations. And, the memories 200a and 200b can be utilized as buffers. Each of the memories 200a and 200b may be implemented into one of a flash memory-type storage medium, a hard disc-type storage medium, a multimedia card micro-type storage medium, a card-type memory (e.g. Secure Digital (SD) memory, eXtreme Digital (XS) memory, etc.), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, an optical disk and the like.

Figure 2:
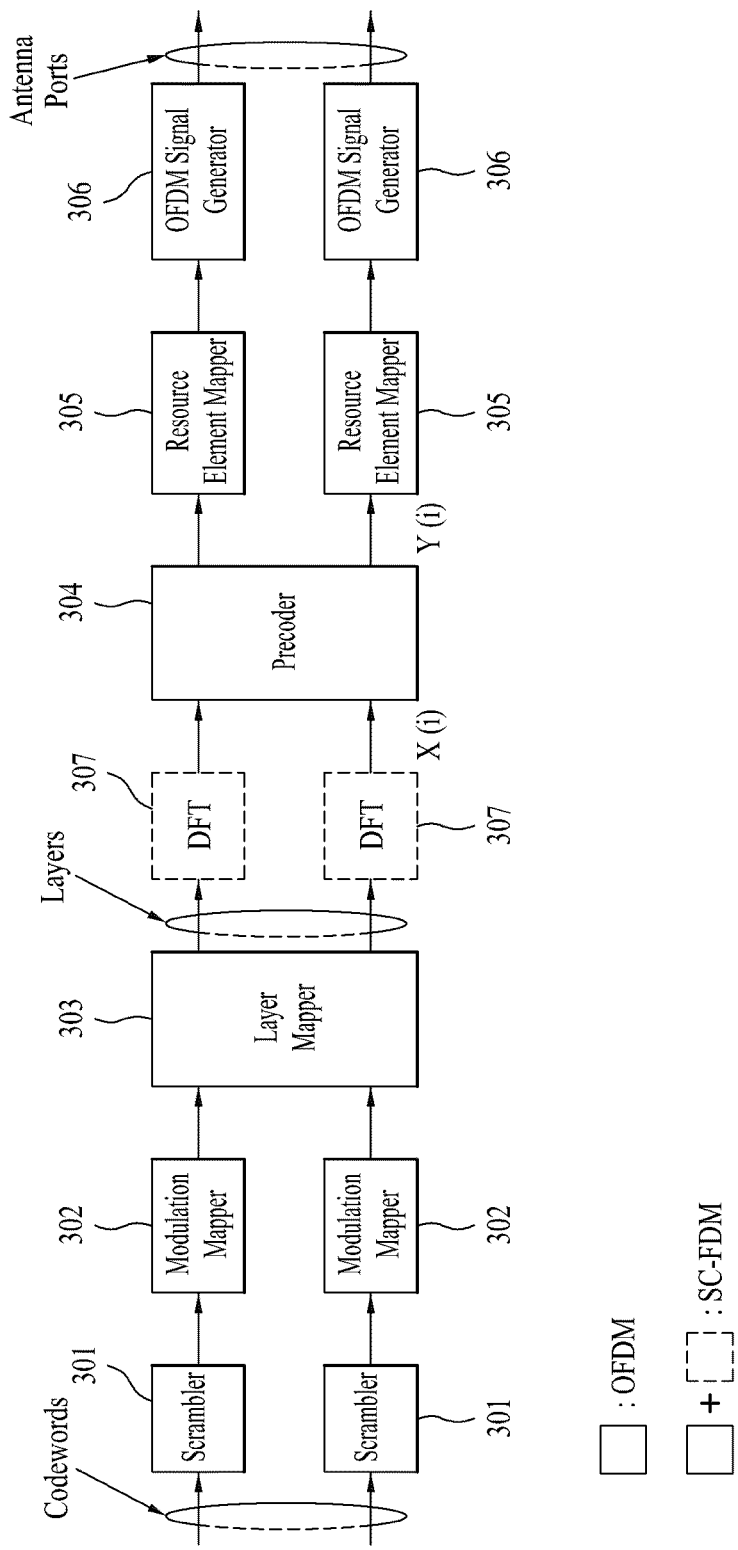
FIG. 2 is a block diagram for a configuration of a transmitter within a user equipment or a base station.

FIG. 2 is a block diagram illustrating an example of a transmitter in each of the UE and the BS. Operations of the transmitters 100a and 100b will be described below in more detail with reference to FIG. 2.

Referring to FIG. 2, the transmitters 100a and 100b include a scrambler 301, a modulation mapper 302, a layer mapper 303, a precoder 304, resource element mappers 305, OFDM signal generators 306. The transmitters 100a and 100b can transmit more than one codewords. Coded bits in each codeword are scrambled by the scrambler 301 to be transmitted on a physical channel. A codeword may be referred to as a data stream and is equivalent to a data block from the MAC layer. The data block from the MAC layer is referred to as a transport block.

The scrambled bits are modulated by the modulation mapper 302 to generate complex-valued modulation symbols. The modulation mappers 302 modulate the scrambled bits to be arranged as complex-valued modulation symbols representing positions on a signal constellation in a predetermined modulation scheme. The modulation scheme may be, but not limited to, any of m-Phase Shift Keying (m-PSK) and m-Quadrature Amplitude Modulation (m-QAM).

The complex-valued modulation symbols are mapped onto one or several transmission layers by the layer mappers 303.

The complex-valued modulation symbols on each layer can be precoded by the precoder 304 for transmission on the antenna ports. In particular, the precoder 304 outputs antenna-specific symbols by processing the complex modulated symbol by MIMO in accordance with the multiple transmitting antennas 500-1, . . . , 500-$N_t$ and then distributes the antenna-specific symbols to the corresponding resource element mapper 305. Namely, the mapping to the antenna port of a transmission layer is performed by the precoder 304. Moreover, the precoder 304 is able to output a matrix z of $N_t \times M_F$ by multiplying an output x of the layer mapper 303 by a precoding matrix W of $N_t \times M_t$.

The complex-valued modulation symbols for each antenna port are mapped/allocated to resource elements by the resource element mappers 305. The resource element mappers 305 can allocate the complex-valued modulation symbols for each antenna port to appropriate subcarriers, and multiplex them according to users.

The OFDM signal generator 306 modulates a complex-modulated symbol for each antenna port, i.e., the antenna-specific symbol by OFDM or SC-FDM to generate a complex-valued time domain OFDM (Orthogonal Frequency Division Multiplexing) symbol signal, or an SC-FDM (Single Carrier Frequency Division Multiplexing) symbol signal. The OFDM signal generators 306 may perform Inverse Fast Fourier Transform (IFFT) on the antenna-specific symbols and can insert a Cyclic Prefix (CP) into the resulting IFFT time-domain symbol. The OFDM symbol is transmitted to a receiving device via each of the transmitting antennas 500-1 to 500-$N_t$ through digital-to-analog conversion, frequency uplink transform and the like. The OFDM signal generator 306 is able to include an IFFT module and CP inserter, a DAC (Digital-to-Analog Converter, a frequency uplink converter and the like.

Meanwhile, if each of the transmitters 100a and 100b adopts SC-FDM access (SC-FDMA) for transmission of codewords, each of the transmitters 100a and 100b can include a discrete Fourier transformer 307 or a fast Fourier transformer. The discrete Fourier transformer 307 performs DFT (discrete Fourier transform) on the antenna-specific symbol to output the DFT symbol to the resource element mapper 305. Meanwhile, the SC-FDMA (single carrier FDMA) is a scheme of signal transmission by lowering PAPR (peak-to-average power ratio) or CM (cubic metric) of a transmission signal. According to SC-FDMA, a transmitted signal can be transmitted by avoiding a non-linear distortion interval of a power amplifier. Hence, even if a transmitter transmits a signal with a power lower than that of the conventional OFDM scheme, a receiver is able to receive a signal that satisfies a predetermined strength and an error rate. In particular, according to the SC-FDMA, a power consumption of a transmitting device can be reduced.

Figure 3:
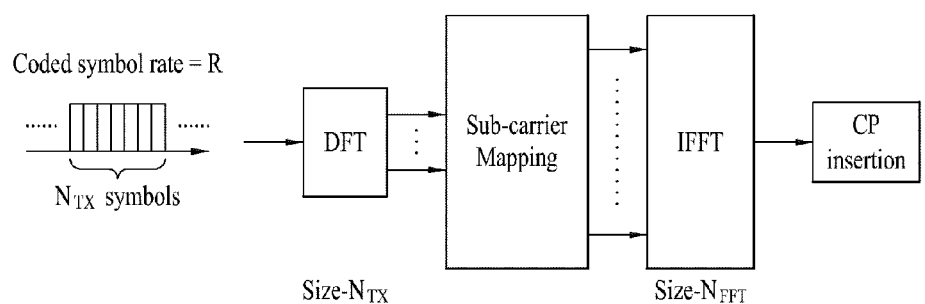
FIG. 3 is a diagram for a configuration of SC-FDMA transmitter.

For reference, 3GPP LTE has adopted SC-FDMA for uplink transmission. FIG. 3 shows one example of a configuration of SC-FDMA transmitter. For instance, the transmitter, which is configured as shown in FIG. 3, is usable for UL PUSCH transmission in 3GPP LTE.

The OFDM signal generator 306 transforms the DFT symbols into time-domain symbols by performing IFFT (inverse fast Fourier transform) on the DFT symbols and a CP (cyclic prefix) is inserted in each of the IFFT time-domain symbols. In the related art OFDM signal generator, when signals carried on subcarriers pass through IFFT, the signals are simultaneously transmitted in parallel by MCM (multi carrier modulation) to cause a problem that power amplifier efficiency is lowered. On the contrary, referring to FIG. 3, SC-FDMA preferentially performs DFT or FFT on information before mapping a signal to a subcarrier. The signals through the DFT/FFT increase PAPR due to the effect of DFT/FFT. The DFT/FFT signal is mapped to a subcarrier by the resource element mapper 305 and is then transformed into a time-domain signal again by IFFT. In particular, if the SC-FDMA transmitter further performs DFT or FFT operation prior to the OFDM signal generator, the PAPR at the IFFT input stage is raised and the PAPR of a final transmission signal is lowered through the IFFT. Since this configuration is as good as adding the DFT or FFT in front of the conventional OFDM signal generator, the SC-FDMA can be called DFT-s-OFDM (DFT-spread OFDM).

Figure 4:
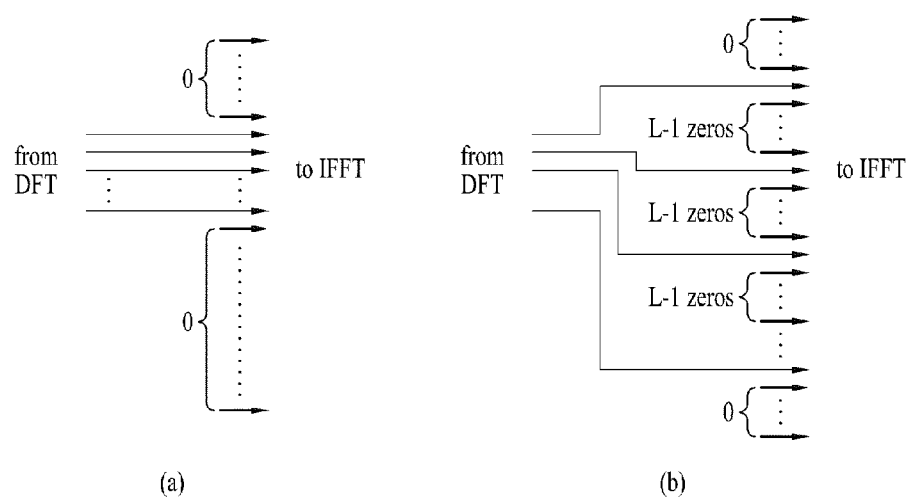
FIG. 4 is a diagram for examples of mapping an input symbol to a subcarrier in a frequency domain.

The SC-FDMA should satisfy the single carrier property. FIG. 4 shows examples of mapping an input symbol to a subcarrier in a frequency domain. If a DFT symbol is allocated to a subcarrier, as shown in FIG. 4 (*a*) or FIG. 4 (*b*), it is able to obtain a transmission signal that satisfies the single carrier property. In particular, FIG. 4 (*a*) shows a localized mapping method and FIG. 4 (*b*) shows a distributed mapping method.

Figure 5:
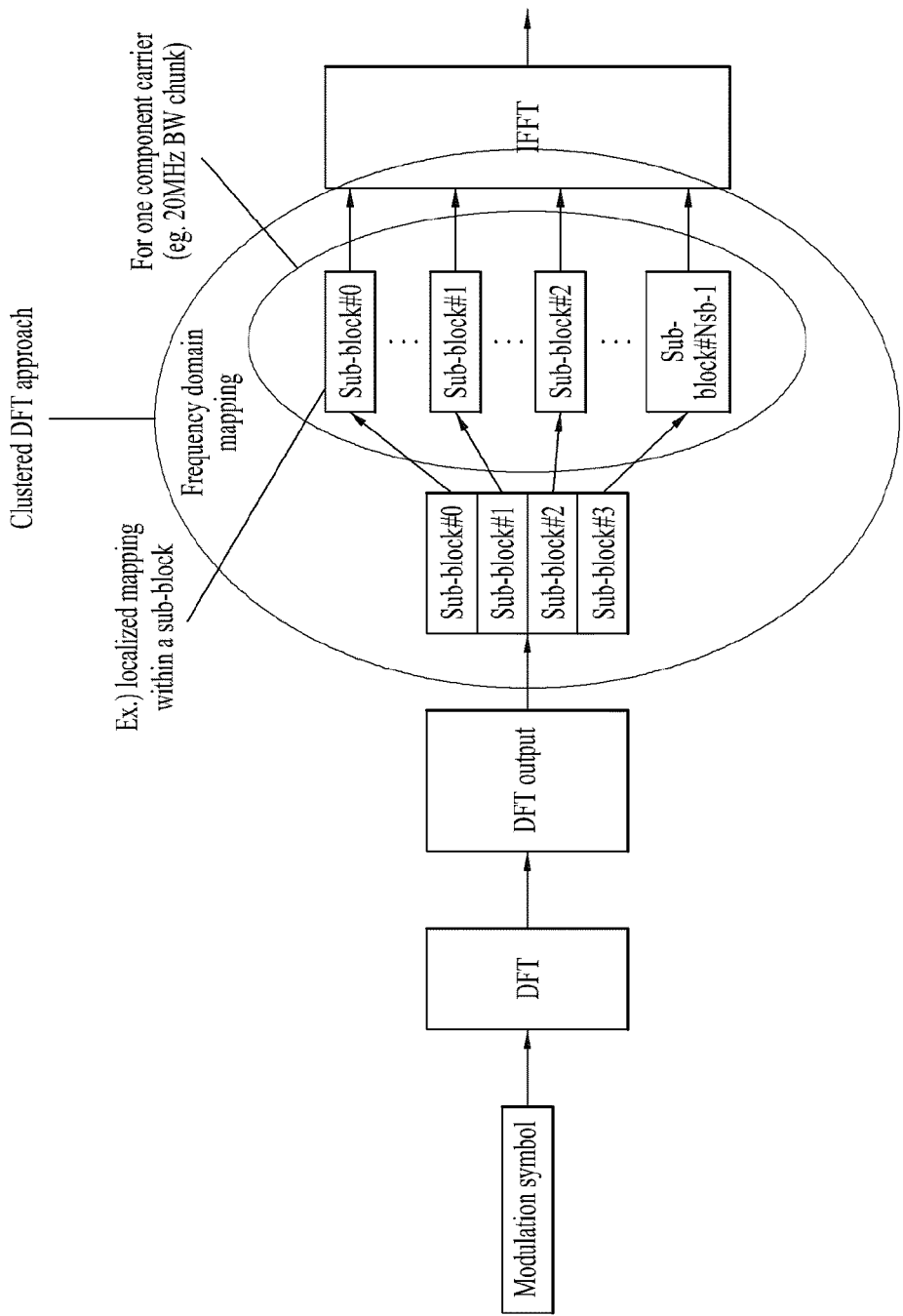
FIGS. 5 to 7 are block diagrams for examples of mapping an input symbol to a single carrier by clustered DFT-s-OFDM.
Figure 6:
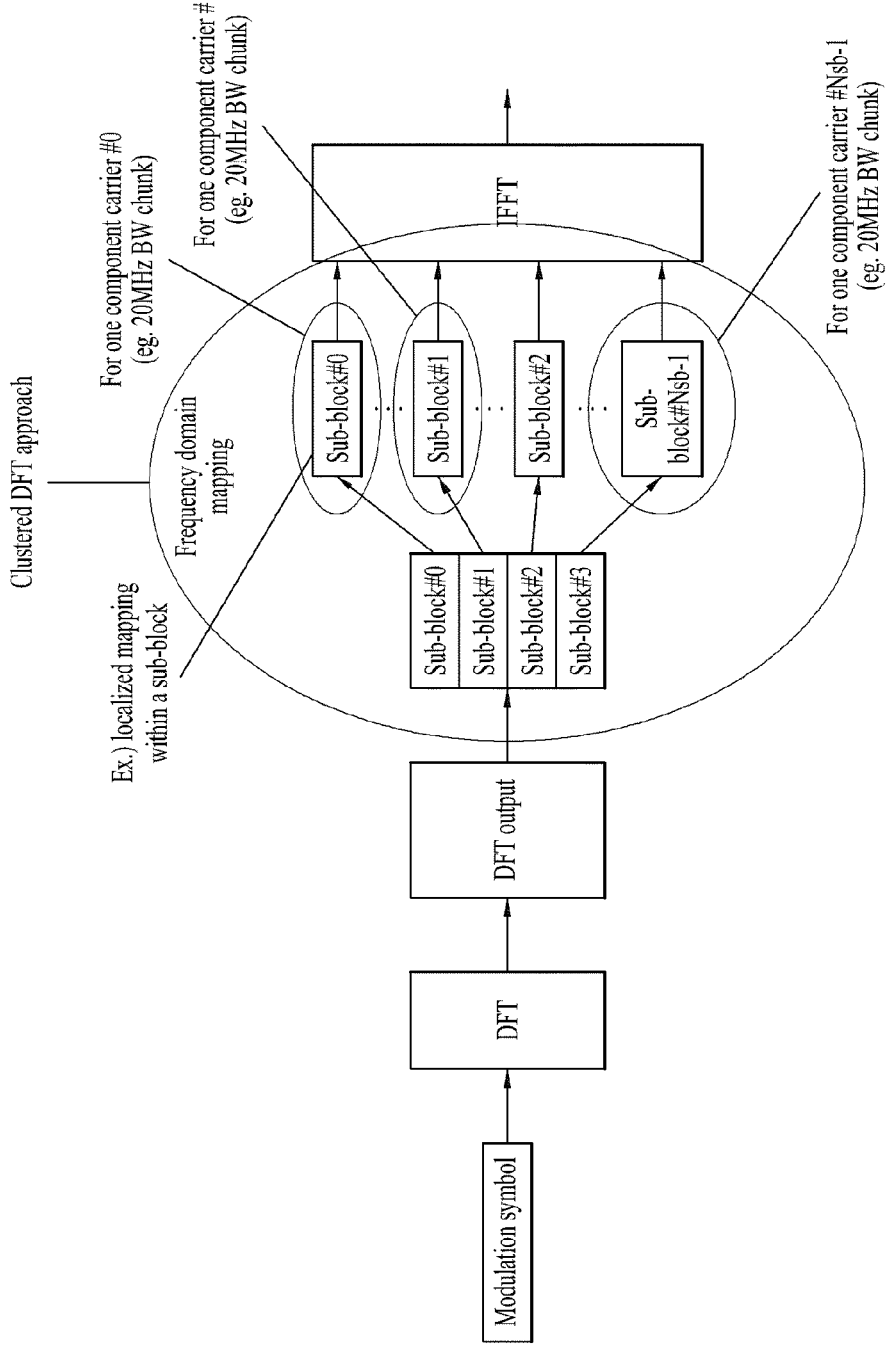
Figure 7:
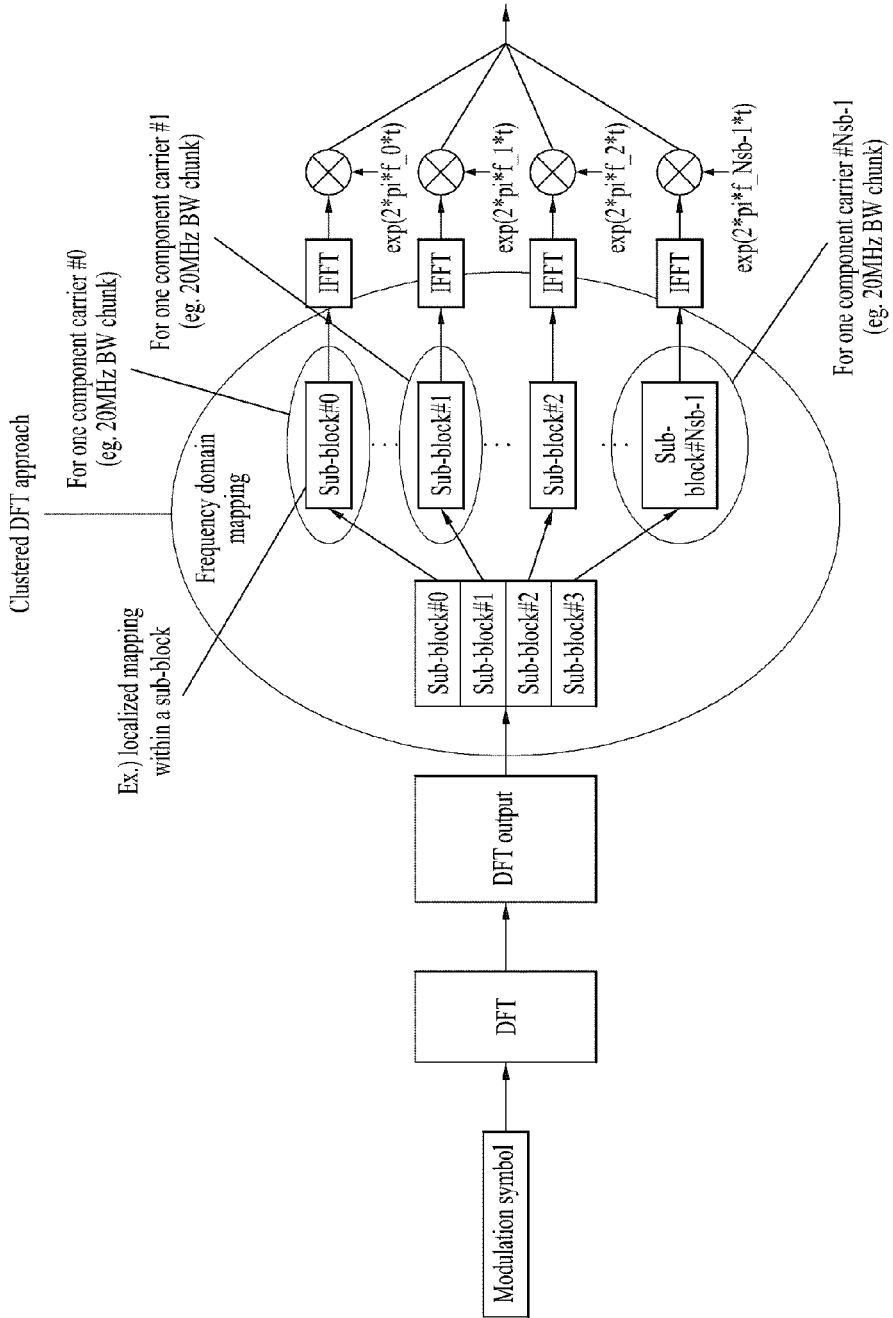

Meanwhile, a scheme called clustered DFT-s-OFDM can be adopted by the transmitter 100*a* or 100*b*. The clustered DFT-s-OFDM is a modification of a conventional SC-FDMA scheme. According to the clustered DFT-s-OFDM, after a signal through the DFT/FFT 307 and the precoder 304 has been segmented into several sub-blocks, the sub-blocks are mapped to subcarriers. FIGS. 5 to 7 are block diagrams for examples of mapping an input symbol to a single carrier by clustered DFT-s-OFDM.

FIG. 5 shows an example of a process for mapping an input symbol to a single carrier in a frequency domain. Referring to FIG. 5, the clustered DFT-s-OFDM is applied to an intra carrier.

FIG. 6 and FIG. 7 show examples of a process for mapping an input symbol to a multi-carrier in a frequency domain. In FIG. 6 or FIG. 7, the clustered DFT-s-OFDM is applied to an inter carrier. Referring to FIG. 6, when contiguous carriers are allocated, if a subcarrier interval is aligned between neighboring carriers, a signal can be generated via a single IFFT block. Referring to FIG. 7, when non-contiguous carriers are allocated, since the carriers are not adjacent to each other, signals can be generated through a plurality of IFFT blocks.

Figure 8:
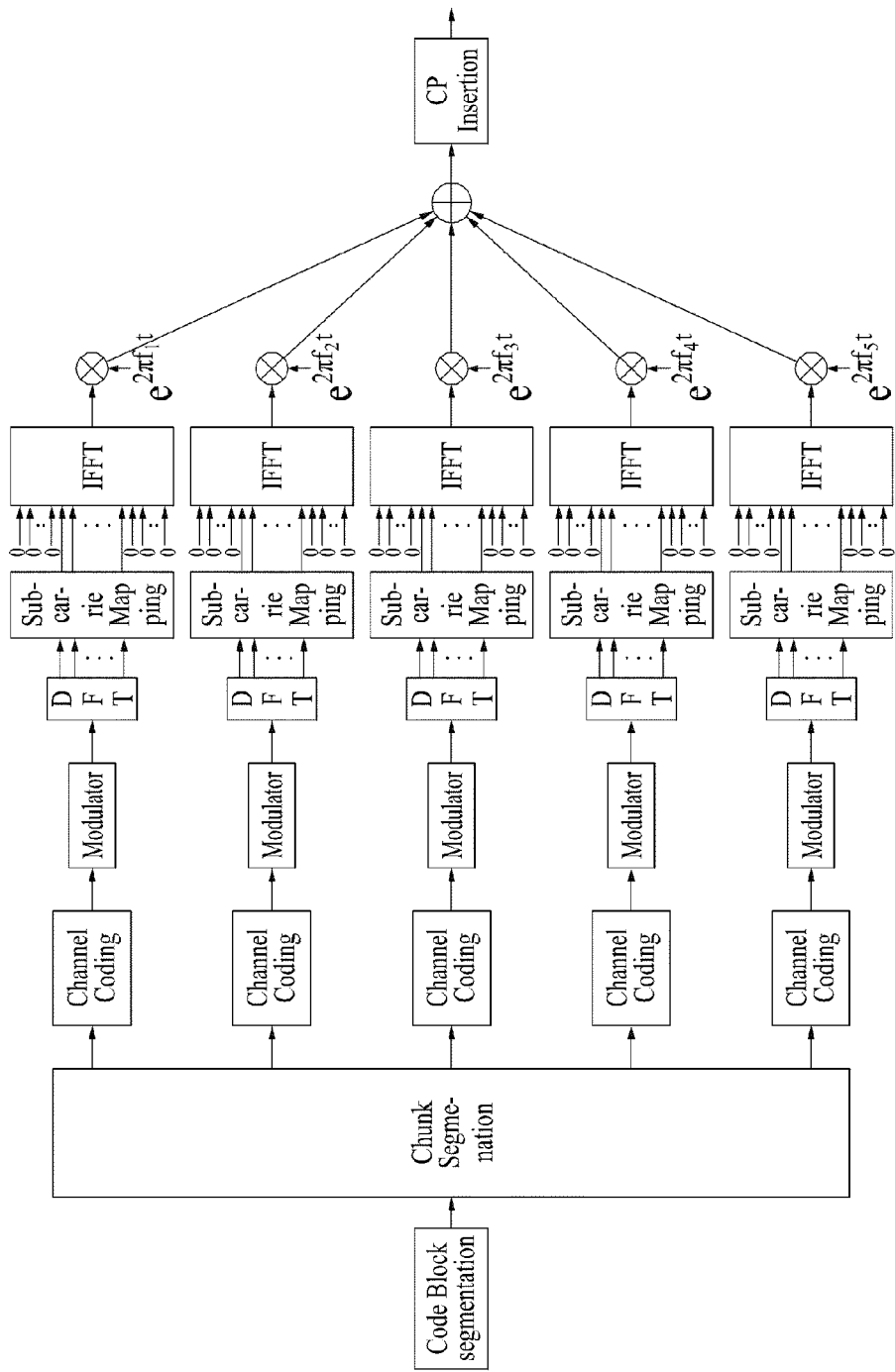
FIG. 8 is a block diagram of chunk-specific DFT-s-OFDM system for performing DFT and precoding by chunk unit.

Meanwhile, a scheme of chunk-specific DFT-s-OFDM can be adopted by the transmitter 100*a* or 100*b*. FIG. 8 is a block diagram of chunk-specific DFT-s-OFDM system for performing DFT and precoding by chunk unit. In this case, the chunk-specific DFT-s-OFDM system can be called Nx SC-FDMA.

A signal processing process of the receiver 300*a* or 300*b* is a configuration inverse to that of the signal processing process of the transmitter. In particular, the receiver 300*a*/300*b* performs decoding and demodulation on a radio signal externally received via the antenna 500*a*/500*b* and then delivers the corresponding radio signal to the corresponding processor 400*a*/400*b*. The antenna 500*a*/500*b* connected to the receiver 300*a*/300*b* can include $n_r$ multiple receiving antennas. Signals received via the receiving antennas are reconstructed into baseband signals and are then reconstructed by multiplexing and MIMO demodulation into a data sequence the transmitter 100*a*/100*b* originally attempts to transmit. The receiver 300*a*/300*b* is able to include a signal reconstructor configured to reconstruct a received signal into a baseband signal, a multiplexer configured to multiplex received signals by combining them together, and a channel demodulator configured to demodulate a multiplexed signal sequence into a corresponding codeword. The signal reconstructor, the multiplexer and the channel demodulator can be integrated into a single module for performing their functions or can be configured with independent modules, respectively. In particular, the signal reconstructor can include an analog-to-digital converter configured to converting an analog signal to a digital signal, a CP remover configured to removing a CP from the digital signal, an FFT module configured to output a frequency-domain symbol by applying FFT (fast Fourier transform) to the CP-removed signal, and a resource element demapper/equalizer configured to reconstruct the frequency-domain symbol into an antenna-specific symbol. In this case, the antenna-specific symbol is reconstructed into a transmission layer by the multiplexer and the transmission layer is then reconstructed by the channel demodulator into a codeword the transmitter attempts to transmit.

Meanwhile, in case that the receiver 300*a*/300*b* receives a signal transmitted in accordance with the SC-FDMA scheme described with reference to FIGS. 3 to 8, the receiver 300*a*/300*b* additionally includes an IDFT (inverse discrete Fourier transform) module (or an IFFT module). In this case, the IDFT/IFFT module performs IDFT/IFFT on the antenna-specific symbol reconstructed by the resource element demapper and then outputs the IDFT/IFFT symbol to the multiplexer.

For reference, although FIGS. 1 to 8 teach that the scrambler 301, the modulation mapper 302, the layer mapper 303, the precoder 304, the resource element mapper 305 and the OFDM signal generator 306 are included in the transmitter 100*a*/100*b*, it is also possible for the processor 400*a*/400*b* of the transmitting device to include the scrambler 301, the modulation mapper 302, the layer mapper 303, the precoder 304, the resource element mapper 305 and the OFDM signal generator 306. Likewise, FIGS. 1 to 8 teach that the signal reconstructor, the multiplexer and the channel demodulator are included in the receiver 300*a*/300*b*, it is also possible for the processor 400*a*/400*b* of the receiving device to include the signal reconstructor, the multiplexer and the channel demodulator. For clarity of the following description, assume that the scrambler 301, the modulation mapper 302, the layer mapper 303, the precoder 304, the resource element mapper 305 and the OFDM signal generator 306 are included in the transmitter 100*a*/100*b* separated from the processor 400*a*/400*b* configured to control operations of the scrambler 301, the modulation mapper 302, the layer mapper 303, the precoder 304, the resource element mapper 305 and the OFDM signal generator 306. And, assume that the signal reconstructor, the multiplexer and the channel demodulator are included in the receiver 300*a*/300*b* separated from the processor 400*a*/400*b* configured to control operations of the signal reconstructor, the multiplexer and the channel demodulator. Moreover, in case that the scrambler 301, the modulation mapper 302, the layer mapper 303, the precoder 304, the resource element mapper 305 and the OFDM signal generator 306 are included in the processor 400*a*/400*b* or in case that the signal reconstructor, the multiplexer and the channel demodulator are included in the processor 400*a*/400*b*, embodiments of the present invention are applicable in the same manner.

Figure 9:
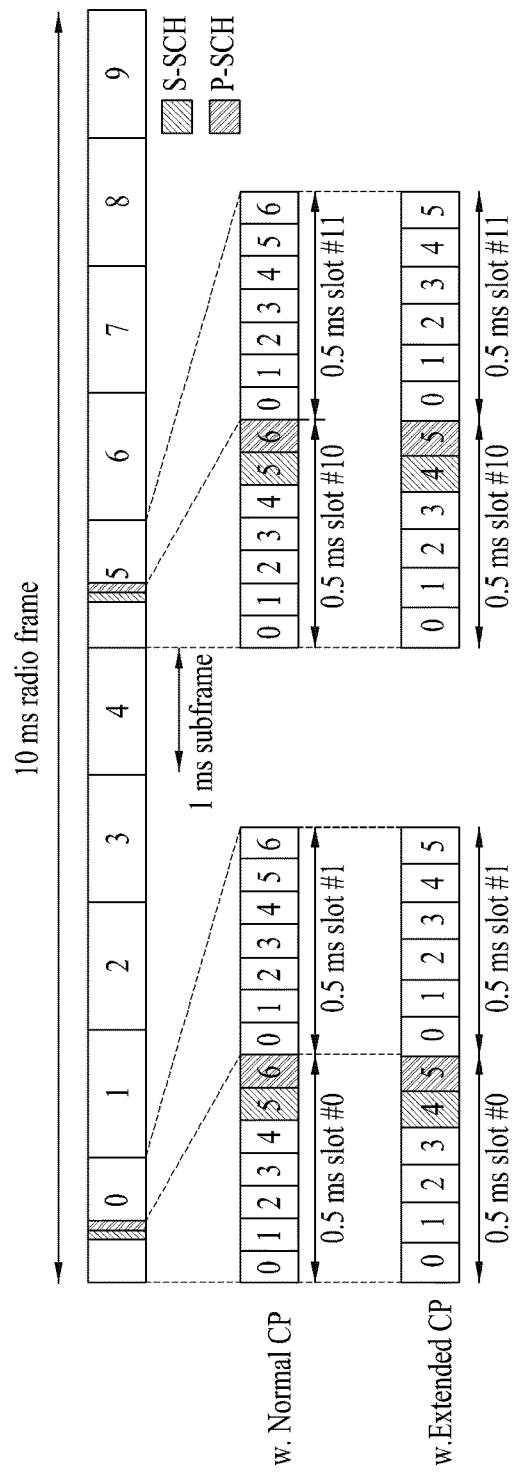
FIG. 9 is a diagram for one example of a radio frame structure used in a wireless communication system.

FIG. 9 is a diagram for one example of a radio frame structure used in a wireless communication system. In particular, FIG. 9 exemplarily shows the structure of the radio frame in the 3GPP LTE/LTE-A system. And, the radio frame structure shown in FIG. 9 is applicable to FDD mode, half FDD mode (H-FDD mode), and TDD mode.

Referring to FIG. 9, the radio frame used in 3GPP LTE/LTE-A has a length of 10 ms (i.e., 307200$T_s$) and includes 10 subframes in equal size. In this case, $T_s$ indicates a sampling time and can be represented as $T_s=1/(2048\times15\text{ kHz})$. Each of the subframes has a length of 1 ms and includes 2 slots. 20 slots within one radio frame are sequentially numbered 0 to 19. Each of the slots has a length of 0.5 ms. And, a time taken to transmit one subframe is defined as TTI (transmission time interval).

Figure 10:
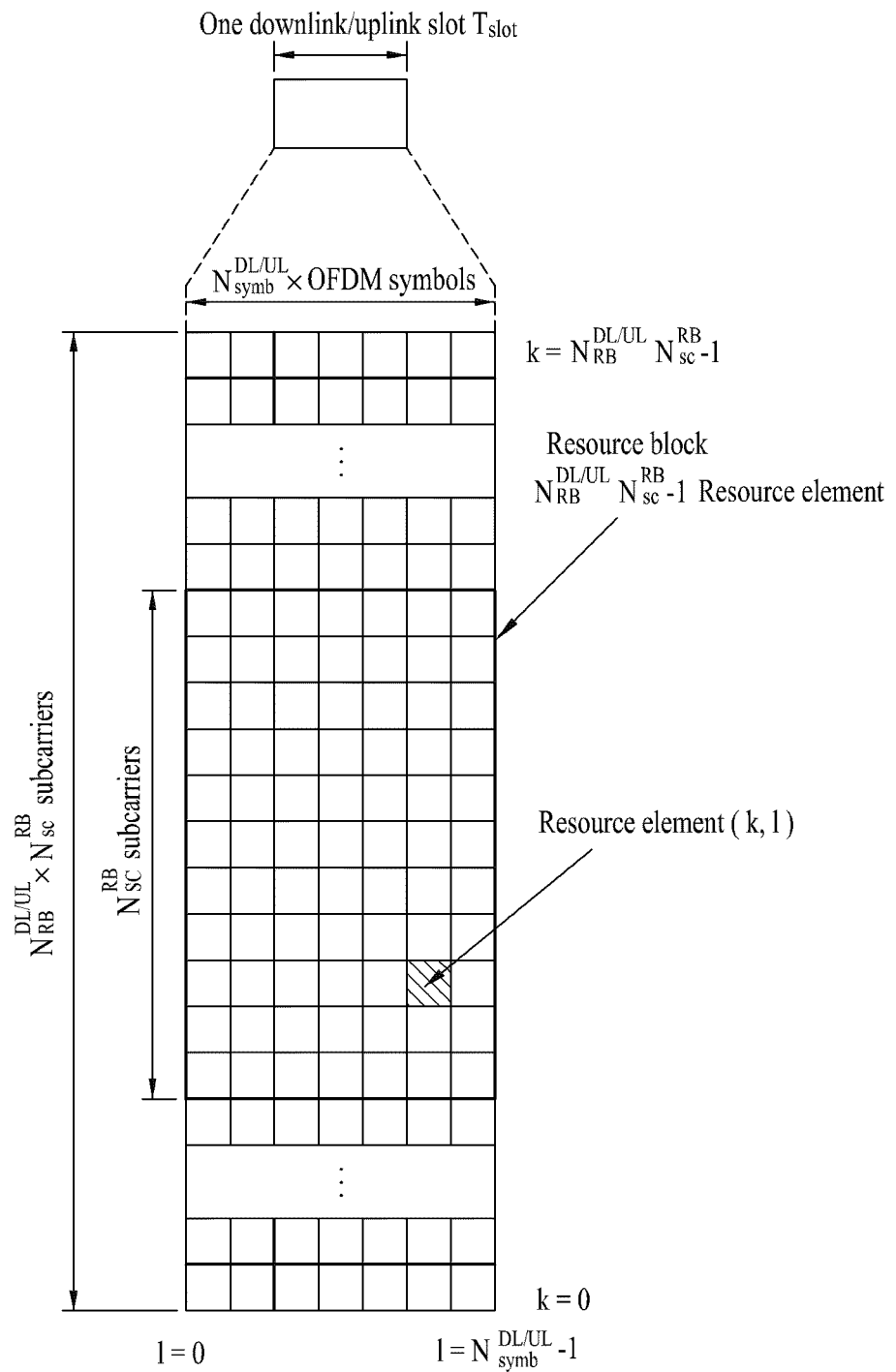
FIG. 10 is a diagram for one example of DL/UL slot structure in a wireless communication system.

FIG. 10 is a diagram for one example of DL/UL slot structure in a wireless communication system. In particular, FIG. 10 shows a structure of a resource grid of the 3GPP LTE/LTE-A system.

Referring to FIG. 10, a slot includes a plurality of OFDM symbols in a time domain and also includes a plurality of RBs (resource blocks) in a frequency domain. In this case, each of the OFDM symbols may mean a symbol interval. Each of the resource blocks includes a plurality of subcarriers in the frequency domain. The number of the OFDM symbols included in one slit can be variously changed in accordance with a channel bandwidth, a length of CP and the like. For instance, in case of a normal CP, one slit includes 7 OFDM symbols. In case of an extended CP, one slot includes 6 OFDM symbols. For clarity, although FIG. 10 exemplarily shows a subframe having one slot include 7 OFDM symbols, embodiments of the present invention are applicable to subframes respectively having different numbers of OFDM symbols in the same manner. For reference, a resource including one OFDM symbol and one subcarrier is called a resource element or a tone.

Referring to FIG. 10, a signal transmitted in each slot can be represented as a resource grid including $N^{DL/UL}_{RB}N^{RB}_s$ subcarriers and $N^{DL/UL}_{symb}$ OFDM or SC-FDM symbols. In this case, the $N^{DL}_{RB}$ indicates the number of RBs in DL slot, the $N^{UL}_{RB}$ indicates the number of RBs in uplink slot, the $N^{DL}_{symb}$ indicates the number of OFDM or SC-FDM symbols within the DL slot, the $N^{UL}_{symb}$ indicates the number of OFDM or SC-FDM symbols within a UL slot, and the $N^{RB}_{sc}$ indicates the number of subcarriers constructing one RB.

So to speak, a physical resource block (PRB) is defined by the $N^{DL/UL}_{symb}$ contiguous OFDM or SC-FDM symbols in the time domain and the $N^{RB}_{sc}$ contiguous subcarriers in the frequency domain. Hence, one PRB includes $N^{DL/UL}_{symb} \times N^{RB}_{sc}$ resource elements.

Each resource element in a resource grid can be uniquely defined by an index pair (k, l) within one slot. In this case, the 'k' is the index given as 0 to $N^{DL/UL}_{RB}N^{RB}_{sc}-1$ in the frequency domain, while the 'l' is the index given as 0 to $N^{DL/UL}_{symb}-1$ in the time domain.

Figure 11:
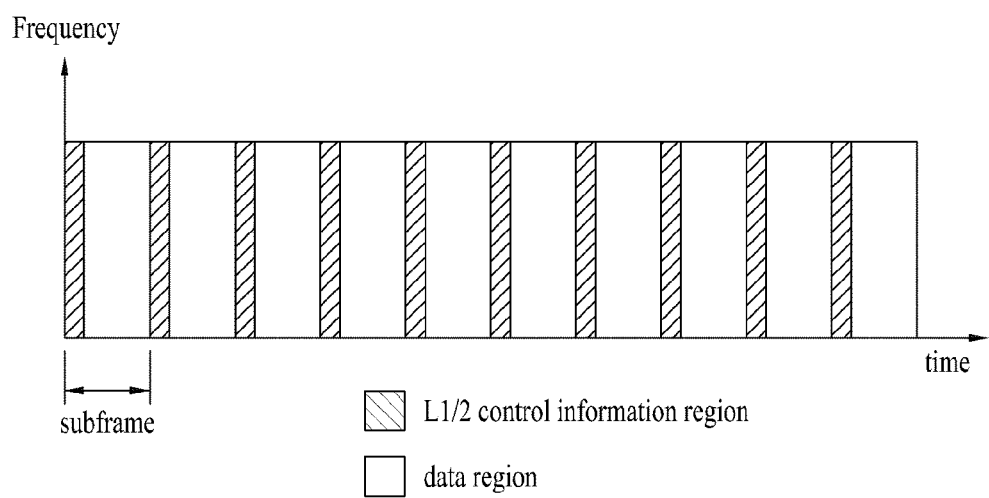
FIG. 11 and FIG. 12 are diagrams of structures of a downlink frame and a physical channel, respectively.
Figure 12:
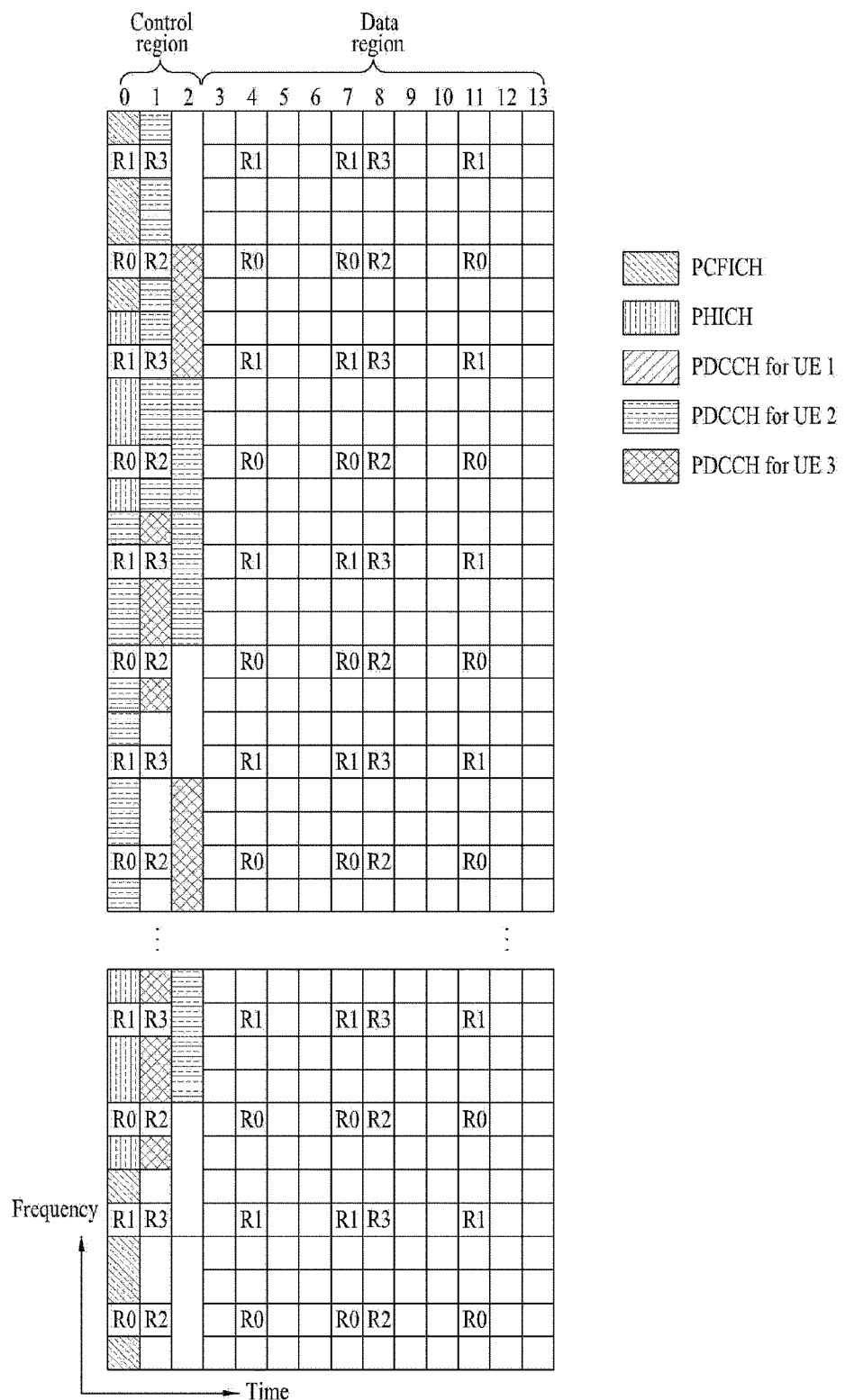

FIG. 11 and FIG. 12 are diagrams of structures of a downlink frame and a physical channel, respectively.

Referring to FIG. 11, a subframe includes a control region for carrying scheduling information and other control informations and a data region for carrying DL data. Referring to FIG. 12, the control region starts with a first OFDMA symbol of the subframe and includes at last one OFDMA symbols. A size of the control region can be set independently for each subframe. In the drawing, R1 to R4 indicate cell-specific reference signals (CRS) for antennas 0 to 3, respectively. The control region includes PCFICH (Physical Control Format Indicator Channel), PHICH (Physical Hybrid ARQ Indicator Channel), and PDCCH (Physical Downlink Control Channel). The data region includes PDSCH (Physical Downlink Shared Channel). And, a basic resource unit for constructing the control channel is REG (Resource Element Group). In this case, the REG includes four neighboring resource elements (REs) except a reference signal (RS). In this case, the RE is a minimum unit of a time-frequency resource and can be defined by one subcarrier and one OFDMA symbol. The RE is indicated by an index pair (k, l). In this case, the 'k' indicates a subcarrier index and the 'l' indicates an OFDMA symbol index.

The PCFICH indicates Physical Control Format Indicator Channel and informs a user equipment of the number of OFDMA symbols used for PDCCH each subframe. The PHICH (Physical Hybrid ARQ Indicator Channel) carries H-ARQ ACK/NACK for UL data and includes 3 REGs. The PHICH shall be described in detail with reference to the accompanying drawings later. The PDCCH is Physical Downlink Control Channel and is allocated to first n OFDM symbols in a subframe. In this case, the 'n' is an integer equal to or greater than 1 and can be indicated by the PCFICH. The PDCCH is allocated by a CCE unit. And, one CCE includes 9 REGs. The PDCCH provides information related to resource allocations of transport channels such as PCH (paging channel) and DL-SCH (downlink-shared channel), uplink scheduling grant, H-ARQ information and the like. The PCH (paging channel) and DL-SCH (downlink-shared channel) are carried on the PDSCH. A base station and a user equipment transmit or receive data on the PDSCH in general except a specific control signal or a specific service data. Information indicating a prescribed user equipment(s) (i.e., at least one user equipments) to which data of PDSCH is transmitted, information indicating how the user equipments receive and decode the PDSCH data and the like are transmitted by being included in the PDCCH. For instance, assume that a specific PDCCH is CRC masked with RNTI (radio network temporary identity) called 'A'. And assume that information on data transmitted using a radio resource (e.g., frequency position) called 'B' and transport format information (e.g., transport block size, modulation scheme, coding information, etc.) called 'C' is transmitted via a specific subframe. A user equipment of a corresponding cell monitors the PDCCH using the RNTI information of its own. A user equipment having the RNTI A receives the PDCCH and also receives PDSCH indicated by the B and the C through the information of the received PDCCH.

Figure 13:
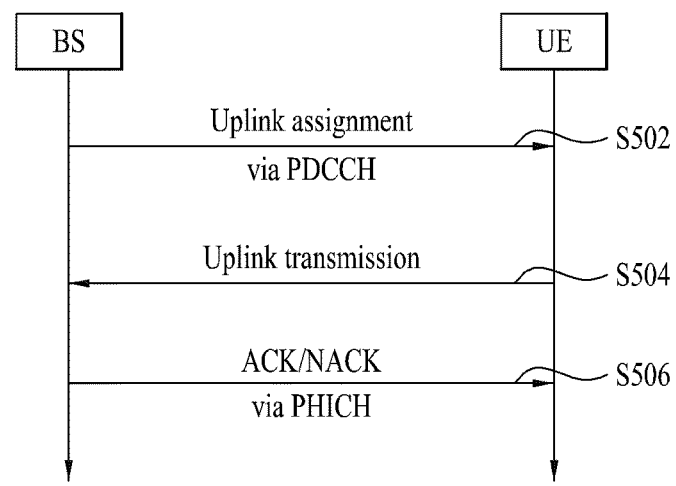
FIG. 13 is a flowchart for a method of transmitting ACK/NACK signal for uplink data in LTE system.

FIG. 13 is a flowchart for a method of transmitting ACK/NACK signal for uplink data in LTE system.

Referring to FIG. 13, a network node (e.g., a base station) transmits UL allocation information to a user equipment on PDCCH [S502]. Control information for UL allocation can be called a UL grant and includes resource block allocation information for PUSCH transmission, cyclic shift information for DMRS (data demodulation reference signal) and the like. Thereafter, the user equipment transmits UL data (e.g., PUSCH) to the base station in accordance with the UL allocation information [S504]. The base station receives the UL data from the user equipment and then transmits a reception response signal (ACK/NACK) for the UL data to the user equipment on PHICH [S506].

A plurality of PHICHs can be mapped to the same resource element unit (e.g., REG) and construct a PHICH group. Each of the PHICHs within the same PHICH group can be discriminated as an orthogonal sequence. And, the PHICH resource can be identified by an index pair ($n^{group}_{PHICH}$, $n^{seq}_{PHICH}$). In this case, the $n^{group}_{PHICH}$ indicates the PHICH group number and the $n^{seq}_{PHICH}$ indicates an orthogonal sequence index within the PHICH group. The $n^{group}_{PHICH}$ and $n^{seq}_{PHICH}$ can be confirmed using a lowest PRB index among PRB (Physical Resource Block) indexes allocated for the PUSCH transmission and a cyclic shift of DMRS transmitted as UL grant. Formula 1 shows an example of finding the $n^{group}_{PHICH}$ and the $n^{seq}_{PHICH}$.

$$n^{group}_{PHICH} = (I^{lowest\_index}_{PRB\_RA} + n_{DMRS}) \bmod N^{group}_{PHICH} + I_{PHICH} N^{group}_{PHICH}$$

$$n^{seq}_{PHICH} = (\lfloor I^{lowest\_index}_{PRB\_RA} / N^{group}_{PHICH} \rfloor + n_{DMRS}) \bmod 2N^{group}_{SF}$$ [Formula 1]

In Formula 1, the $n_{DMRS}$ is mapped from a cyclic shift value for DMRS. The $N^{PHICH}_{SF}$ indicates a spreading factor size used for PHICH modulation. The $I^{lowest\_index}_{PRB\_RA}$ indicates a lowest PRB index for PUSCH transmission. And, the $N^{group}_{PHICH}$ indicates the number of PHICH groups.

Table 1 exemplarily shows the mapping between the $n_{DMRS}$ and the cyclic shift value in the DMRS field.

TABLE 1

| Cyclic Shift for DMRS Field in DCI format 0 | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

* DCI (downlink control information) format 0: This indicates a downlink control information format used in carrying UL allocation information in LTE.

In case of FDD frame (frame structure type 1), the number $N^{group}_{PHICH}$ of PHICH groups is constant for all subframes. And, the number of the PHICH groups in one subframe is given by Formula 2.

$$N^{group}_{PHICH} = \begin{cases} \lceil N_g (N^{DL}_{RB})/8 \rceil & \text{for normal } CP \\ 2 \cdot \lceil N_g (N^{DL}_{RB})/8 \rceil & \text{for extended } CP \end{cases}$$ [Formula 2]

In Formula 2, the '$N_g \in \{1/6, 1/2, 1, 2\}$' is provided by an upper layer and the $N^{DL}_{RB}$ indicates the number of resource blocks (RBs) on a DL band.

In case of TDD frame (frame structure type 2), the number of PHICH groups can vary for each DL subframe and can be given as $m_i \cdot N^{group}_{PHICH}$. Table 2 represents the $m_i$.

TABLE 2

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Figure 14:
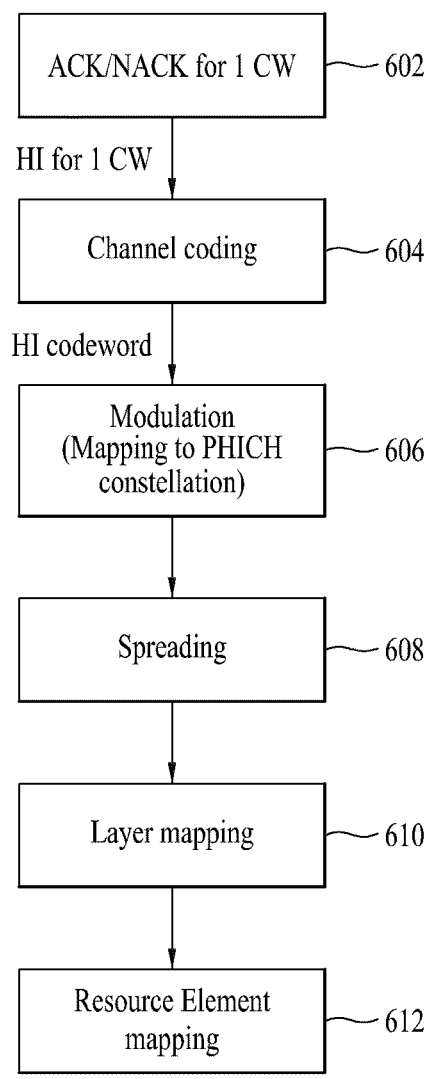
FIG. 14 is a block diagram of a PHICH signal processing process.

FIG. 14 is a block diagram for one example of a PHICH signal processing process.

Referring to FIG. 14, a PHICH processing process includes ACH/NACK (A/N) generation 602, coding (e.g., channel coding) 604, modulation 606, spreading 608, layer mapping 610 and resource element mapping 612.

The ACK/NACK generating block 602 generates 1-bit ACK/NACK in accordance with a decoding result of PUSCH (corresponding to data stream, codeword or transport block) received from a user equipment. Since the LTE system does not use SU-MIMO (single user multiple input multiple output) in UL, the 1-bit ACK/NACK for PUSCH transmission of one user equipment, i.e., a single data stream is transmitted on the PHICH only. In the following description, the 1-bit ACK/NACK outputted from the ACK/NACK generating block 602 shall be named HARQ indicator (HI).

Figure 15:
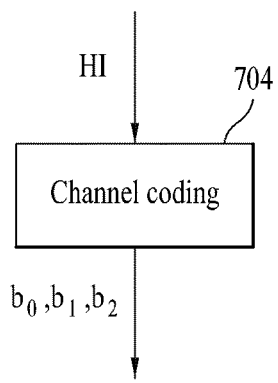
FIG. 15 is a diagram of a channel coding block for HI.

FIG. 15 is a diagram of a channel coding block for the HI.

Referring to FIG. 14 and FIG. 15, the coding block 604/704 of the conventional LTE generates 3-bit HI codeword ($b_0$, $b_1$, $b_2$) by performing repetition coding having a code rate set to 1/3 on the 1-bit HI. 'HI=1' indicates positive acknowledgement (ACK) and 'HI=0' indicates negative acknowledgment (NACK), and vice versa.

Table 3 shows the relation between the HI and the HI codeword in the conventional LTE.

TABLE 3

| HI | HI codeword <$b_0$, $b_1$, $b_2$> |
|---|---|
| 0 | <0, 0, 0> |
| 1 | <1, 1, 1> |

Subsequently, the modulation block 606 corresponding to the modulation mapper 302 shown in FIG. 2 modulates the bit blocks b(0), ..., b($M_{bit}$−1) (i.e., HI codeword) transmitted on one PHICH into modulated symbol blocks z(0), ..., z($M_s$−1). In the LTE system, the PHICH is modulated by BPSK (binary phase shift keying).

The spreading block 608 spreads the modulated symbol blocks z(0), ..., z($M_s$−1) by multiplying them by an orthogonal sequence by symbol unit (i.e., symbol-wise) and then generates a modulated symbol sequence d(0), ..., d($M_{symb}$−1) by applying scrambling thereto. Formula 3 exemplarily shows a processing process of the spreading block 608. The transmitter 100b of the base station separately may include the spreading block 608. Alternatively, the spreading block 608 may be included in the modulation mapper 302.

$$d(i) = w(i \bmod N^{PHICH}_{SF}) \cdot (1 - 2c(i)) \cdot z(\lfloor i/N^{PHICH}_{SF} \rfloor),$$ [Formula 3]

Where i=0, ..., $M_{symb}$−1,
$M_{symb} N^{PHICH}_{SF} \cdot M_s$, $N^{PHICH}_{SF}$=4 for normal cyclic prefix, and 2 for extended cyclic prefix.

In Formula 3, c(i) indicates a cell-specific scrambling sequence. The scrambling sequence generator can be reset each frame by Formula 4.

$$c_{init} = (\lfloor n_s/2 \rfloor + 1) \cdot (2N^{cell}_{ID} + 1) \cdot 2^9 + N^{cell}_{ID}$$ [Formula 4]

In Formula 4, the $n_s$ indicates a subframe index and the $N^{cell}_{ID}$ indicates a cell identifier.

The sequence $[w(0) \ldots w(N^{PHICH}_{SF}-1)]$ indicates an orthogonal sequence for PHICH, and the sequence index $n^{seq}_{PHICH}$ corresponds to a PHICH number within the PHICH group.

Table 4 represents the spreading sequence $[w(0) \ldots w(N^{PHICH}_{SF}-1)]$.

TABLE 4

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The layer mapping block 610 corresponding to the layer mapper 303 shown in FIG. 2 performs resource group alignment, layer mapping and precoding. The resource group alignment is performed in a manner of aligning the spread modulated symbol sequence $d(0), \ldots, d(M_{symb}-1)$ by a unit of REG (resource element group) to provide the symbol blocks $d^{(0)}(0), \ldots, d^{(0)}(c \cdot M_{symb}-1)$. In case of a normal CP (cyclic prefix), c=1. In case of an extended CP (cyclic prefix), c=2. A method of performing the resource group alignment is exemplarily shown as follows.

In case of the normal CP: $d^{(0)}(i)=d(i)$, for $i=0, \ldots, M_{symb}-1$.

In case of the extended CP: Formula 5 for $I=0, \ldots, (M_{symb}/2)-1$.

$$[d^{(0)}(4i) \ d^{(0)}(4i+1) \ d^{(0)}(4i+2) \ d^{(0)}(4i+3)]^T = \begin{cases} [d(2i) \ d(2i+1) \ 0 \ 0]^T & n^{group}_{PHICH} \bmod 2 = 0 \\ [0 \ 0 \ d(2i) \ d(2i+1)]^T & n^{group}_{PHICH} \bmod 2 = 1 \end{cases}$$ [Formula 5]

Thereafter, the symbol block $d^{(0)}(0), \ldots, d^{(0)}(c \cdot M_{symb}-1)$ is transformed in a vector block $y(i)=[y^{(0)}(i), \ldots, y^{(P-1)}(i)]^T$ ($i=0, \ldots, c \cdot M_{symb}-1$) through layer mapping and precoding. In this case, the $y^{(p)}(i)$ indicates a signal for an antenna port p (p=0, \ldots, P−1). In case of LTE, the number of antenna ports for a cell-specific reference signal is $P \in \{1, 2, 4\}$. The layer mapping and the precoding depend on a CP length and the number of antenna ports used in PHICH transmission.

The resource mapping block 612 corresponding to the resource element mapper 305 shown in FIG. 2 performs various operations to map the spread symbol sequence received from the layer mapping block 610 to a physical resource.

Table 5 represents the PHICH duration defined by LTE. The PHICH duration is set by an upper layer.

TABLE 5

| PHICH duration | Non-MBSFN subframes | | MBSFN subframes |
|---|---|---|---|
| | Subframes 1 and 6 in case of frame structure type 2 | All other cases | On a carrier supporting both PDSCH and PMCH |
| Normal | 1 | 1 | 1 |
| Extended | 2 | 3 | 2 |

Figure 16:
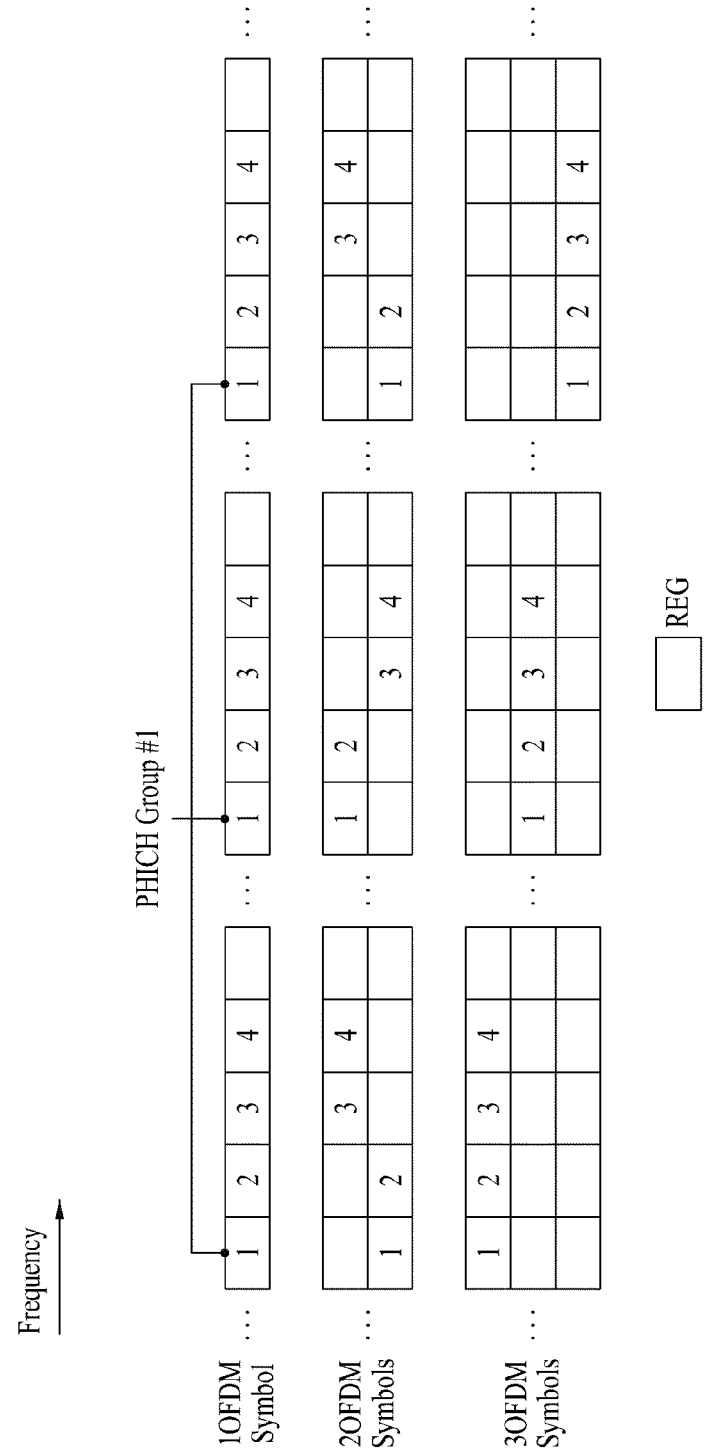
FIG. 16 is a diagram for example of allocating PHICH within a control region in accordance with Table 5.

FIG. 16 is a diagram for example of allocating PHICH within a control region in accordance with Table 5. The PHICH is mapped to the REG left except PCHICH and RS within OFDMA symbol.

Referring to FIG. 16, a PHICH group is transmitted using 3 REGs spaced apart from each other in a frequency domain as far as possible. Hence, each bit of the HI codeword is carried on each of the REGs. The PHICH groups are contiguously allocated in the frequency domain. The same numeral in the drawing indicates the REG belonging to the same PHICH group. The PHICH duration is limited by a size of the control region. And, the PHICH duration corresponds to 1 to 3 OFDMA symbols. In case that a plurality of OFDMA symbols are used for PHICH transmission, the REGs belonging to the same PHICH group for transmission diversity are transmitted using different OFDMA symbols, respectively.

Meanwhile, the UL retransmission request can be configured by the aforesaid PHICH. Once a user equipment received NACK via PHICH, the user equipment performs synchronous non-adaptive retransmission in a manner of retransmitting a target packet of the NACK on the same frequency resource of transmitting a first packet at a timing point after elapse of a predefined time from a timing point of transmitting the first packet.

The configuration of DCI format 0 is exemplarily shown in the following. And, the UL retransmission request can be configured by the aforesaid PHICH.

TABLE 6

| Information Field | Bits |
|---|---|
| Carrier Indicator | 1 or 3 |
| Flag for format0/format1A differentiation | 1 |
| Hopping flag | 1 |
| RB assignment and hopping resource allocation | $\lceil \log_2(N_{RB}^{UL}(N_{RB}^{UL} + 1)/2) \rceil$ |
| Modulation and coding scheme and redundancy version (MCS) | 5 |
| New Data Indicator (NDI) | 1 |
| TPC command for scheduled PUSCH | 2 |
| Cyclic shift for DMRS and OCC index | 3 |
| UL index for TDD | 2 |
| Downlink assignment index (DAI) for TDD | 2 |
| CQI request | 1 or 2 |
| SRS request | 1 or 2 |
| Multi-cluster flag | 1 |

Referring to Table 6, if an NDI (new data indicator) within the DCI format 0 for a prescribed transport block is toggled by being compared to NDI within a previous DCI format 0 for the transport block, a user equipment regards a previous pack transmission as successful and then empties a buffer of the user equipment, in which the packet was stored. On the contrary, if a current NDI is not toggled by being compared to a previous NDI, a user equipment regards a previous packet transmission as unsuccessful and then performs a synchronous adaptive retransmission in a manner of retransmitting the packet failed in transmission on a frequency resource indicated by UL allocation information within the DCI format 0 at a timing point after elapse of a predefined time from a timing point of transmitting a first packet of the transport block.

In case that a user equipment simultaneously receives PHICH and UL allocation information of the DCI format 0, the user equipment ignores the PHICH and transmits a signal to a base station in accordance with the UL allocation information. For instance, although the user equipment receives ACK via the PHICH, if the NDI is not toggled, the user equipment performs the synchronous adaptive retransmission without emptying the buffer for the previous packet. Although the user equipment receives NACK via PHICH, if the NDI is toggled, the buffer for the previous packet is emptied/flushed.

Figure 17:
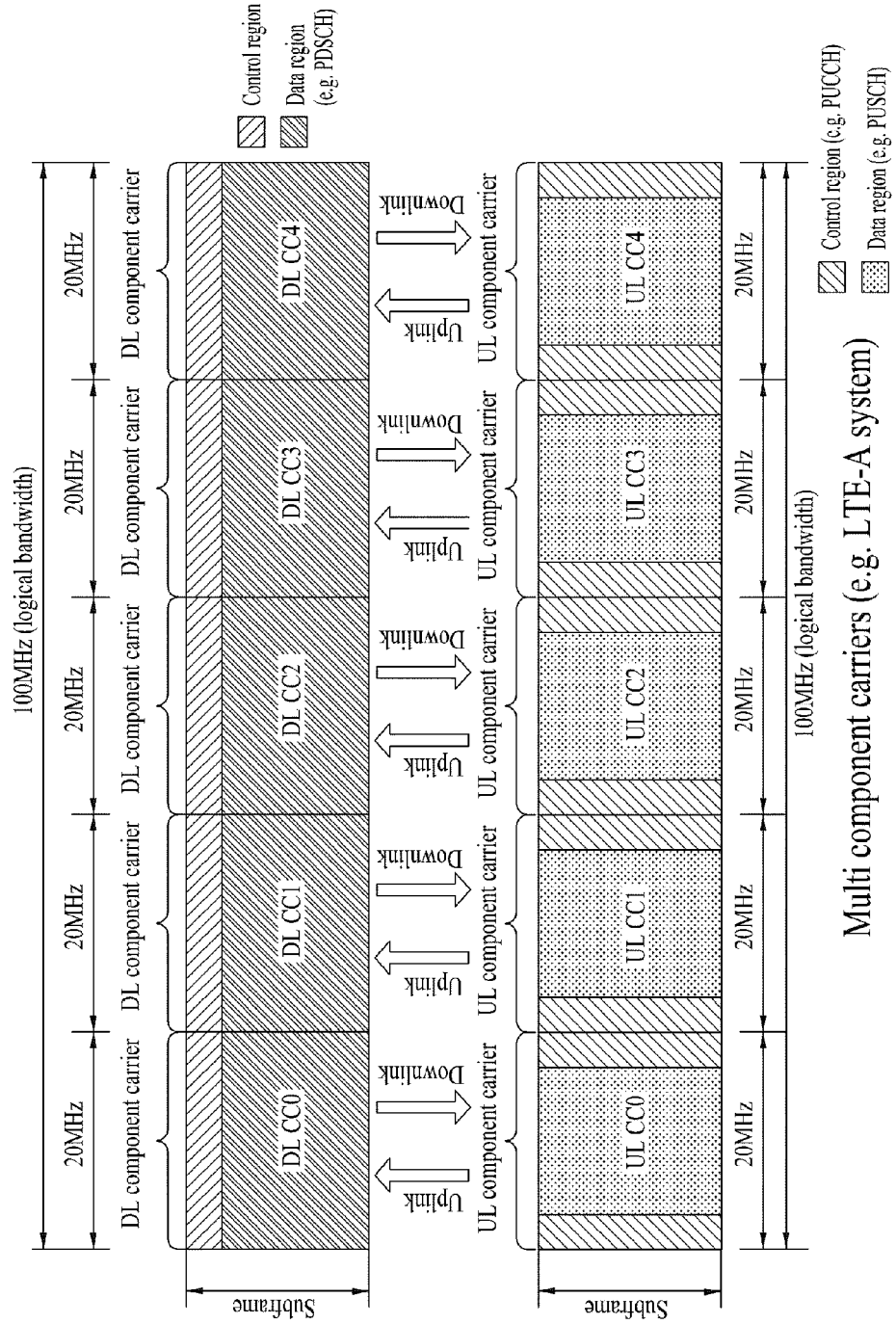
FIG. 17 is a diagram for one example of a carrier aggregation (CA) communication system.

FIG. 17 is a diagram for one example of a carrier aggregation (CA) communication system.

Referring to FIG. 17, a plurality of UL/DL component carriers (CCs) are aggregated to support wider UL/DL bandwidths. The component carriers (CCs) may or may not be adjacent to each other. For convenience, FIG. 17 shows that bandwidths of UL component carriers are equal to and symmetric to those of the DL component carriers. Yet, the bandwidths of the component carriers can be set independent from each other. Moreover, it is able to aggregate component carriers asymmetrically in a manner that the number of the UL component carriers is different from that of the DL component carriers [asymmetric carrier aggregation]. In this case, the asymmetric carrier aggregation is generated due to limitation on available frequency bands or can be artificially established by network setting. For instance, even if a system band includes N CCs, a frequency band receivable by a user equipment can be limited to the number M (<N) of CCs. Meanwhile, in order to reduce battery consumption of a user equipment, it is able to set the user equipment to receive control information via specific DL CC only. Such a specific DL CC is named a primary DL CC (or a primary cell), while another DL CC can be named a secondary DL CC (or a secondary cell).

Besides, due to prescribed reason(s) (e.g., asymmetric carrier aggregation, TDD mode, relay backhaul link, MIMO, etc.), it may happen that the number of ACKs/NACKs, which should be transmitted via one DL subframe, become considerable. For example of UL MIMO, an LTE-A user equipment is able to transmit maximum two UL codewords (or transport blocks). In this case, HARQ response to the UL transmission of the user equipment should be configured to enable retransmission per UL codeword (or transport block). Yet, since the HARQ response to the aforesaid HARQ response to 1 PHICH and/or 1 NDI is designed to fit a single UL codeword, HARQ response to multiple UL codewords should be appropriately defined.

In the following description, configurations of UL retransmission request based on PHICH and DCI format for PUSCH scheduling according to embodiments of the present invention are explained. First of all, if the number of multiple UL codewords is defined as maximum 2, a base station is able to generate ACK/NACK information for two codewords transmitted by a user equipment in one of the following cases shown in Table 7.

TABLE 7

| Cases | 1$^{st}$ CW | 2$^{nd}$ CW |
|---|---|---|
| Case-1 | ACK | ACK |
| Case-2 | ACK | NACK |

TABLE 7-continued

| Cases | 1$^{st}$ CW | 2$^{nd}$ CW |
|---|---|---|
| Case-3 | NACK | ACK |
| Case-4 | NACK | NACK |

In the following table, combinations of PHICH and NDI selectable in UL system using maximum 2 codewords are enumerated.

TABLE 8

| | Number of PHICHs | Number of NDIs |
|---|---|---|
| Alt-1 | 2 | 2 |
| Alt-2 | 2 | 1 |
| Alt-3 | 1 | 2 |
| Alt-4 | 1 | 1 |

First of all, Table 6 has exemplarily shown the DCI format 0 that carries scheduling information for single UL codeword by including one NDI field. Yet, it is able to define a new DCI format that carried scheduling information for multiple UL codewords by having scheduling information per codeword and NDI field per codeword. Accordingly, 2 NDIs in Alt-1 or Alt-3 in Table 8 are included in two different DCIs, respectively, or can be included in one DCI. For instance, a base station is able to transmit PUSCH scheduling information for two transport blocks to a user equipment using two DCI format 0's or is able to transmit PUSCH scheduling information for two transport blocks to a user equipment using one new DCI format. Irrespective of DCI format for carrying NDI and the number of the DCIs, if the NDIs amounting to the number defined in each option provided by Table 8 are transmitted to a user equipment, embodiments of the present invention are applicable.

In the following description, embodiments for configuring HARQ response for each case shown in Table 7 using the options enumerated in Table 8 are explained.

<Alt-1 (2-PHICH, 2-NDI)>

In case of using 2 PHICHs and 2 NDIs, 1 PHICH and 1 NDI can be independently configured for each UL codeword. Hence, a user equipment just performs retransmission in accordance with a status of each PHICH and a status of each NDI. In this case, a base station transmits ACK/NACK on PHICH and/or NDI by a method defined for a single codeword per codeword, and a user equipment performs the retransmission per codeword by the aforesaid HARQ response method.

<Alt-2 (2-PHICH, 1-NDI)>

Using 2 PHICHs and 1 NDI, all the four cases shown in Table 7 can be represented. For instance, if a user equipment receives PUSCH scheduling information, it is able to perform HARQ response in consideration of both of the PUSCH scheduling information and the PHICHs instead of ignoring the PHICHs.

In this case, since the PHICH resource is always reserved for the PHICH transmission, it is able to configure the user equipment to perform a non-blanking retransmission in a manner of retransmitting the NACK-occurring codeword only, based on the PHICH and initiating a new transmission of the ACK-occurring codeword. Meanwhile, since the PUSCH scheduling is the control information that is additionally transmitted if necessary, if the NACK occurs in at least one of the two codewords, it is able to configure the user equipment to perform a blanking retransmission in a manner of retransmitting both of the two codewords.

For instance, in case of receiving 2 PHICHs and the PUSCH scheduling information in which 1 NDI are toggled, a user equipment retransmits NACK-occurring codeword using a previously used frequency resource and MCS or transmits/retransmits ACK-occurring codeword in accordance with the PUSCH scheduling information. In this case, the user equipment can be configured to empty a buffer for the corresponding codeword only if the NDI is toggled and the PHICH of the corresponding codeword is ACK. For instance, if the NDI is toggled and both of the two PHICHs indicate ACK, the user equipment empties the buffer of the two codewords all and then initiates a new transmission. On the contrary, if the NDI is not toggled and both of the two PHICHs indicate NACK, the user equipment retransmits both of the two codewords without emptying the buffer through a resource defined in the PUSCH scheduling information.

Specifically, assuming such a carrier aggregation situation as shown in FIG. 17, a base station should transmit an HI independent per UL CC to a user equipment, the multiple PHICH resource based method may cause a more serious problem.

Therefore, in the following description, embodiments of transmitting ACK/NACK information on multiple codewords to a user equipment without increasing PHICH resources are explained.

<Alt-3 (1-PHICH, 2-NDI)>

Using 1 PHICH and 2 NDIs, it is able to represent all the four cases shown in Table 4. In particular, it is able to configure a user equipment to perform a blanking retransmission only based on PHICH. And, the user equipment can be configured to perform a non-blanking retransmission based on PUSCH scheduling using NDI. Operations of a user equipment in accordance with 1 PHICH and 2 NDI transmitted by a base station are represented as follows.

TABLE 9

| Cases | PHICH | NDIs ($1^{st}$ CW/$2^{nd}$ CW) | UE behavior |
|---|---|---|---|
| Case-1 | ACK | None | Wait for UL grant without emptying a buffer for two codewords. |
| Case-4 | NACK | None | Perform a retransmission of two codewords. In doing so, the same resource and MCS for a previous transmission are applied to the corresponding retransmission. |
| Case-1 | | Toggle/Toggle | After a buffer for two codewords is emptied, a new transmission is initiated in accordance with information of UL grant. In doing so, PHICH information is ignored. |
| Case-2 | — | Toggle/Non-toggle | After a buffer for NDI-toggled codeword is emptied, a new transmission is performed. For non-NDI-toggled codeword, a retransmission is performed in accordance with information of UL grant. In doing so, PHICH information is ignored. |
| Case-3 | | Non-toggle/Toggle | |
| Case-4 | — | Non-toggle/Non-toggle | A retransmission for two codewords is performed. In doing so, resource and MCS for the retransmission are performed in accordance with information of UL grant. In particular, information of PHICH is ignored. |

According to the aforesaid embodiments of Alt-1 and Alt-2 using the two PHICHs, since one HI is 1-bit information that represents a state of ACK (e.g., HI=1) or NACK (e.g., HI=0) for one UL codeword (or transport block), total 2 bits are needed to transmit DL ACK and DL NACK corresponding to two UL codewords (or two transport blocks). Meanwhile, according to the technology of the LTE (Rel-8/9), it is able to transmit one HI (i.e., 1-bit HI) only using one PHICH resource (i.e., one index pair ($n^{group}_{PHICH}$, $n^{seq}_{PHICH}$)). Hence, according to the foresaid embodiments of using two PHICHs, in order to perform 2-bit HI transmission to cope with a situation of transmitting a plurality of ACKs/NACKs (e.g., UL MIMO), the DL ACK/NACK is transmitted to a user equipment using a PHICH resource different per UL codeword (or transport block) by allocating two PHICH resources. Yet, if two PHICH resources are used for one user equipment, it may happen that the number of PHICH resources is in short.

Referring to Table 9, in case that a base station simultaneously transmits PHICH and PUSCH scheduling information to a user equipment, the user equipment ignores the PHICH and operates in accordance with the PUSCH scheduling information. In case that the base station transmits ACK on PHICH to the user equipment, since the PHICH does not carry the PUSCH scheduling information, the user equipment does not take any action until receiving the PUSCH scheduling information.

In Table 9, whether the user equipment empties a buffer of a previously transmitted codeword is determined based on NDI of the PUSCH scheduling irrespective of the PHICH. Yet, in determining whether the user equipment will empty the buffer, it is able to define that the PHICH is further taken into consideration. Operations of the user equipment in further consideration of the PHICH are exemplarily shown in Table 10.

TABLE 10

| Cases | PHICH | NDIs ($1^{st}$ CW/$2^{nd}$ CW) | UE behavior |
|---|---|---|---|
| Case-1 | ACK | None | Wait for UL grant without emptying a buffer for two codewords. |
| Case-4 | NACK | None | Perform a retransmission of two codewords. In doing so, the same resource and MCS for a previous transmission are applied to the corresponding retransmission. |

TABLE 10-continued

| Cases | PHICH | NDIs (1st CW/2nd CW) | UE behavior |
|---|---|---|---|
| Case-1 | ACK or NACK | Toggle/Toggle | If PHICH indicates ACK, after a buffer for two codewords is emptied, a new transmission is initiated in accordance with information of UL grant. If PHICH indicates NACK, a buffer for two codewords is not emptied and a new transmission is initiated in accordance with information of UL grant. |
| Case-2 | ACK or NACK | Toggle/Non-toggle | After a buffer for NDI-toggled codeword is emptied, a new transmission is performed. For non-NDI-toggled codeword, a retransmission is Z,899; |
| Case-3 | | Non-toggle/Toggle | |
| Case-4 | ACK or NACK | Non-toggle/Non-toggle | A retransmission for two codewords is performed. In doing so, resource and MCS for the retransmission are performed in accordance with information of UL grant. In particular, information of PHICH is ignored. |

Referring to Table 9 and Table 10, in case that a base station transmits NACK using PHICH only, a user equipment is able to perform a blanking retransmission. In order to perform a non-blanking retransmission, the user equipment according to the embodiment of Alt-3 is able to wait until the base station transmits the PUSCH scheduling information to the user equipment.

<Alt-4 (1-PHICH, 1-NDI)>

Based on 1 PHICH or 1 NDI, it is able to configure a user equipment to perform a blanking retransmission for a non-adaptive retransmission or an adaptive retransmission. In this case, a base station is able to inform the user equipment of one of two codewords, which should be transmitted, using 'enable/disable' of a prescribed transport block. Based on the enable/disable information, the user equipment is able to perform a non-blanking retransmission.

A base station configured according to one of the embodiments Alt-1 to Alt-4 is able to generate one PHICH (Alt-3 or Alt-4) or two PHICHs (Alt-1 or Alt-2). In doing so, the base station generates each PHICH indicating ACK or NACK, as shown in FIG. 14 or FIG. 15, and is then able to transmit the generated PHICH to the user equipment. Moreover, the base station sets NDI(s) according to the corresponding embodiment and is then able to transmit DL control information (DCI) including the NDI(s) to the user equipment. The base station processor 400b determined whether a reception of multiple codewords received from the user equipment is successful and is then able to configure ACK/NACK information on the multiple codewords according to one of the embodiments Alt-1 to Alt-4. For instance, the base station processor 400b is able to generate each PHICH indicating ACK or NACK in FIG. 14 or FIG. 15. And, the base station processor 400b is able to generate DCI including NDI(s) set according to the corresponding embodiment. The transmitter 100b of the base station is able to transmit the PHICH(s) and the DCI to the user equipment under the control of the base station processor 400b.

Based on the PHICH(s) and the NDI(s) received from the base station, according to the corresponding one of the embodiments Alt-1 to Alt-4, the user equipment determines whether the codeword transmitted by the user equipment has been successfully transmitted to the base station and then performs a retransmission of the unsuccessful-transmission codeword. The user equipment processor 400a is able to obtain ACK or NACK information from the corresponding PHICH by processing the PHICH received from the base station in an inverse manner of the former processing process described with reference to FIG. 14 and FIG. 15. The user equipment processor 400a detects its PDCCH from a plurality of PDCCHs transmitted on a control region by blind decoding by controlling the receiver 300a of the user equipment. Based on the NDI within the DCI transmitted on the PDCCH of the user equipment and the PHICH(s), the user equipment processor 400a is able to check whether the transmission of each codeword transmitted by the user equipment is successful. The user equipment processor 400a is able to control the memory 200a to empty a buffer of the transmission-successful codeword. And, the user equipment processor 400a is able to control the user equipment transmitter 100a to perform a retransmission of the transmission-unsuccessful codeword.

<1-PHICH with/without 1-NDI>

According to the embodiment Alt-3 or Alt-4, it is advantageous in that ACK/NACK information on multiple codewords can be signaled to a user equipment without raising PHICH resources used by the conventional LTE. Yet, in order for the user equipment to perform a non-blanking retransmission, a base station transmits scheduling information on a codeword that should be transmitted to the user equipment. As this transmission of the scheduling information raises downlink control information overhead, it is disadvantageous in that overall system performance is lowered. Therefore, in the following description, without raising PHICH resources and the overhead of the downlink control information, embodiments for a base station to signal one of the four cases shown in Table 7 to a user equipment are explained. According to the following embodiments, if an additional PHICH resource is allocated to a user equipment or even if PUSCH scheduling information is not transmitted to the user equipment, a base station is able to transmit ACK/NACK for multiple codewords to the user equipment. Moreover, the user equipment is able to receive ACK/NACK per codeword for the multiple codewords transmitted by the user equipment using previous PHICH resource and is also able to perform a non-blanking retransmission despite failing to receive the PUSCH scheduling information. For clarity and convenience of the following description, embodiments of the present invention are explained without considering whether the PUSCH scheduling information is separately transmitted to the user equipment. In case that the user equipment simultaneously receives both of the PHICH and the PUSCH scheduling information, the user equipment can be configured to operate by preferentially taking the PHICH described in the following description into consideration. Alternatively, the user equipment can be configured to operate in a manner of preferentially taking the PUSCH scheduling into consideration by ignoring the PHICH.

The conventional PHICH is defined to indicate ACK or NACK. If PHICH is designed to indicate informations more than 2, a user equipment is able to perform a non-blanking retransmission based on the PHICH. For instance, PHICH can be configured to indicate one of '$1^{st}$ CW NACK', '$2^{nd}$ CW NACK' and 'both CWs NACK'. In this case, the $1^{st}$ CW NACK indicates that a base station has successfully received a $2^{nd}$ CW despite that an error exists in a $1^{st}$ CW received by the base station. The $2^{nd}$ CW NACK indicates that an error exists in a $1^{st}$ CW received by a base station despite that the base station has successfully received the $1^{st}$ CW. The both CWs NACK indicates that error exists in every CW received by a base station. A base station configures PHICH for requesting a non-adaptive retransmission, as shown in the following, and is then able to transmit the configured PHICH to a user equipment.

TABLE 11

| | PHICH status | UE behavior |
|---|---|---|
| Case-2 | 2nd CW NACK | A codeword in which error occurs is transmitted at a predetermined time using the same frequency resource and transmission scheme of a previous transmission. For a codeword in which error does not occur, a null transmission is performed. In doing so, the same precoder used previously is used. |
| Case-3 | 1st CW NACK | |
| Case-4 | Both CWs NACK | Retransmission for two codewords is performed at a predetermined time using the same frequency resource, transmission scheme of a previous transmission and the like. |

In order for a base station makes a request for a retransmission of at least one of multiple codewords transmitted by a user equipment, Table 11 shows an example of a case of transmitting PHICH to the user equipment for Case-2, Case-3 and Case-4 among the cases enumerated in Table 7. In case that all CW is ACK, the base station is able to drop the PHICH, namely, the base station is able to perform a null transmission on PHICH resource. In this case, since the user equipment shall receive null information on the PHICH resource allocated to the user equipment, the user equipment is able to determine that all the codewords transmitted by the user equipment have been successfully received by the base station. Accordingly, the user equipment empties its buffer of the previously transmitted codeword and is then able to initiate a new transmission.

For the four cases enumerated in Table 7, it is able to transmit PHICH. If a user equipment (UE) receives the PHICH indicating one of the four kinds of PHICH statuses enumerated in Table 7, it can be configured to operate as follows, for example.

TABLE 12

| | PHICH status | UE behavior |
|---|---|---|
| Case-1 | Both CWs ACK | Since a retransmission is unnecessary, it waits until a UL grant is received. Alternatively, any response action is not taken for PHICH. |
| Case-2 | 2nd CW NACK | |
| Case-3 | 1st CW NACK | A codeword in which error occurs is transmitted at a predetermined time using the same frequency resource and transmission scheme of a previous transmission. For a codeword in which error does not occur, a null transmission is performed. In doing so, the same precoder used previously is used. |

TABLE 12-continued

| | PHICH status | UE behavior |
|---|---|---|
| Case-4 | Both CWs NACK | Retransmission for two codewords is performed at a predetermined time using the same frequency resource, transmission scheme of a previous transmission and the like. |

In order to identify one of three or four kinds of PHICH statuses for multiple codewords transmitted by a prescribed user equipment, according to embodiments of the present invention, the PHICH statuses are represented as different HIs (or HI codewords) and/or arranged at different positions on a signal constellation.

In the following description, an embodiment for configuring HI codeword to represent PHICH statuses more than 2 and an embodiment of the present invention for arranging the PHICH statuses at different positions on a signal constellation are explained.

HI Codeword

Figure 18:
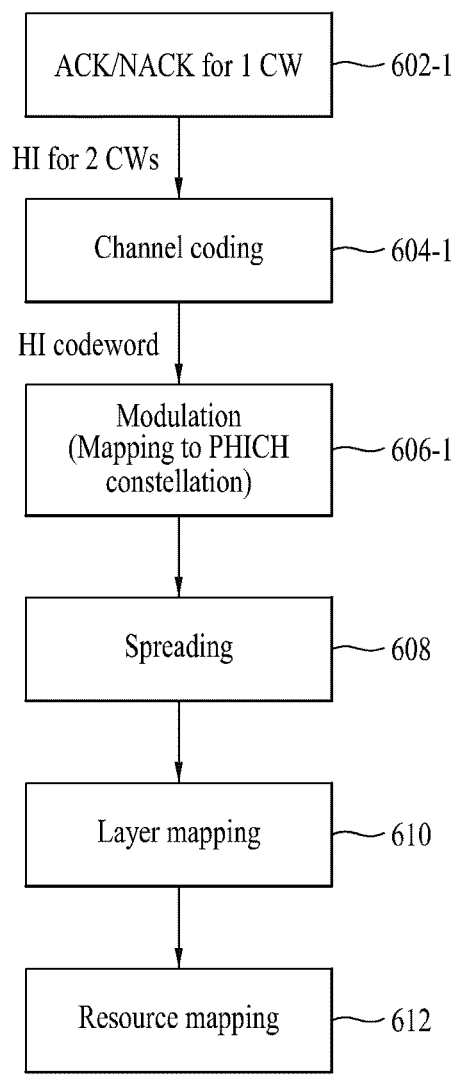
FIG. 18 is a block diagram of a PHICH signal processing process for multiple codewords.

FIG. 18 is a block diagram of a PHICH signal processing process for multiple codewords.

Referring to FIG. 18, an ACK/NACK generating block 602-1 of a base station generates an HI indicating one of the three kinds of the PHICH statuses shown in Table 11 or one of the four kinds of the PHICH statuses shown in Table 12 in accordance with a decoding result of a plurality of codewords from a user equipment.

A channel coding block 604-1 generates an HI codeword by coding the HI in accordance with a determined coding scheme. In this case, the former channel coding block 604 shown in FIG. 14 generates <0, 0, 0> for 'HI=0' indicating NACK or <1, 1, 1> for 'HI=1' indicating ACK, as exemplarily shown in Table 3.

For the three kinds of the PHICH statuses, it can be defined to generate the HI codewords as shown in the following.

TABLE 13

| HI | HI Codeword $<b_0, b_1, b_2>$ | PHICH status |
|---|---|---|
| 0 | <0, 0, 0> | $1^{st}$ CW NACK |
| 1 | <0, 1, 0> | $2^{nd}$ CW NACK |
| 2 | <1, 1, 1> | Both CWs NACK |

Referring to Table 13, the HI codeword <0, 0, 0> or <0, 1, 0> having a relatively small hamming distance between two HI codewords is made to correspond to the PHICH status having error occurred in one codeword. And, the HI codeword <1, 1, 1> having a relatively great hamming distance from <0, 0, 0> or <0, 1, 0> is made to correspond to the PHICH status having error occurred in all codewords.

Meanwhile, for the four kinds of the PHICH statuses, it can be defined to generate the HI codewords as shown in the following, which can be exemplarily shown as Tables 14 to 16.

TABLE 14

| HI | HI Codeword $<b_0, b_1, b_2>$ | PHICH status |
|---|---|---|
| 0 | <0, 0, 0> | $1^{st}$ CW NACK |
| 1 | <0, 1, 0> | $2^{nd}$ CW NACK |
| 2 | <1, 1, 1> | Both CWs NACK |
| 3 | <1, 0, 1> | Both CWs ACK |

TABLE 15

| HI | HI Codeword <$b_0, b_1, b_2$> | PHICH status |
|---|---|---|
| 0 | <0, 0, 1> | $1^{st}$ CW NACK |
| 1 | <1, 0, 0> | $2^{nd}$ CW NACK |
| 2 | <1, 1, 1> | Both CWs NACK |
| 3 | <0, 0, 0> | Both CWs ACK |

TABLE 16

| HI | HI Codeword <$b_0, b_1, b_2$> | Definition |
|---|---|---|
| 0 | <1, 1, 0> | $1^{st}$ CW NACK |
| 1 | <0, 1, 1> | $2^{nd}$ CW NACK |
| 2 | <1, 1, 1> | Both CWs NACK |
| 3 | <0, 0, 0> | Both CWs ACK |

Referring to Table 13 to 16, HI codewords can be defined in a manner that three or four codewords among eight codewords, which can be represented using 3 bits, are previously defined by a specific rule.

Yet, in case that PHICH statuses are mapped to three or four of eight 3-bit codewords, it is disadvantageous in that PHICH transmission error probability increases. In order to prevent the PHICH transmission error probability from increasing, the HI codeword <1, 1, 1> for the ACK information shown in Table 3 can be defined to indicate the transmission failure of one codeword. For instance, referring to Table 17, HI codewords for two UL codewords can be defined.

TABLE 17

| HI | HI Codeword <$b_0, b_1, b_2$> | Definition |
|---|---|---|
| 0 | <0, 0, 0> | NACK |
| 1 | <1, 1, 1> | $1^{st}$ CW NACK or $2^{nd}$ CW NACK |

When a base station transmits HI codeword <1, 1, 1>, it can be observed that a user equipment should retransmit one of the two codewords having transmitted by the user equipment. In case of receiving a DCI carrying the PUSCH scheduling information from the base station, according to the embodiment of Alt-3, the user equipment can be aware of the codeword having failed in transmission based on the NDI in the DCI and is then able to retransmit the transmission-failing codeword to the base station. Alternatively, the user equipment is able to retransmit both of the two codewords without waiting for the PUSCH scheduling information.

A modulation block 606-1 is able to arrange each bit of the HI codeword on a signal constellation. For instance, the modulation block 606-1 modulates the bits constructing the HI codeword in a manner of modulating 0 and 1 into −1 and 1, respectively.

How to map a PHICH status for multiple codewords to HI codeword can be determined in advance or can be transmitted to a user equipment by being configured by higher layer signaling. Alternatively, how to map a PHICH status for multiple codewords to HI codeword can be dynamically signaled via PDCCH to a user equipment.

According to the present embodiment, a base station converts PHICH status for multiple codewords into different HI codewords by channel coding. The channel coding block 604-1 of the present embodiment converts/maps the PHICH status to the corresponding HI codeword, whereas the former channel coding block shown in FIG. 14 performs repetition coding. Therefore, the respective digits of the HI codeword generated by the channel coding block 604-1 of the present embodiment may not be equal to each other.

A user equipment identifies PHICH resource allocated to itself by an index pair ($n^{group}_{PHICH}$, $n^{seq}_{PHICH}$) and is able to check ACK/NACK information on multiple codewords transmitted by the user equipment based on the HI codeword received via the PHICH resource. The user equipment is able to reconstruct the HI codeword by demodulating the signal received via the corresponding PHICH resource. For instance, the user equipment demodulates a signal having a position on the signal constellation set to −1 into 0 and demodulates a signal having a position on the signal constellation set to 1 into 1, thereby reconstructing the HI codeword. The user equipment is able to generate an HI by performing channel decoding on the HI codeword. For instance, referring to Table 13, in case that the HI codeword received by the user equipment is <0, 0, 0>, the user equipment is able to generate 'HI=0' by performing channel decoding on <0, 0, 0>. Since 'HI=0' indicates that a $1^{st}$ codeword is NACK, the user equipment is able to retransmit the $1^{st}$ codeword.

PHICH Constellation

PHICH statuses for multiple codewords can be identified on a signal constellation.

Referring now to FIG. 18, the ACK/NACK generating block 602-1 of the base station generates an HI indicating one of the PHICH statuses shown in Table 11 or an HI indicating one of the four kinds of the PHICH statuses shown in Table 12 in accordance with a decoding result of a plurality of codewords from the user equipment. For instance, the ACK/NACK generating block 602-1 generates an HI using 2 bits to indicate one of the three or four kinds of the PHICH statuses.

The channel coding block 604-1 generates an HI codeword by coding the HI in accordance with a determined coding scheme. For instance, the channel coding block 604-1 is able to generate 6-bit HI codeword from the 2-bit HI using repetition coding of which coding rate is ⅓. Alternatively, according to the embodiment of mapping to the HI codeword in the aforesaid PHICH status, the channel coding block 604-1 is able to generate a 3-bit HI codeword as well. For clarity and convenience of the following description, the HI codeword generated by the repetition coding having the code rate set to ⅓ is represented as <HI0, HI1, HI2>. In this case, HIi indicates a position of the corresponding HI within the HI codeword. For instance, if the HI generated by the ACK/NACK generating block 602-1 is 01, the HI codeword generated by the channel coding block 604-1 becomes <01, 01, 01>. For another instance, if the HI generated by the ACK/NACK generating block 602-1 is 1, the HI codeword generated by the channel coding block 604-1 becomes <1, 1, 1>.

The modulation block 606-1 (corresponding to the demodulation mapper 302 shown in FIG. 2) assigns the HI codeword, which is transmitted on one PHICH, to a complex modulation symbol representing a position on a signal constellation. In order to represent the PHICH statuses shown in Table 11 or Table 12 using one PHICH resource, the modulation block 606-1 is able use a complex plane including a real number domain and an imaginary number domain. A position of the real number domain and a position of the imaginary number domain in the complex plane, as shown in Table 4, can be allocated to different terminals.

Figure 19:
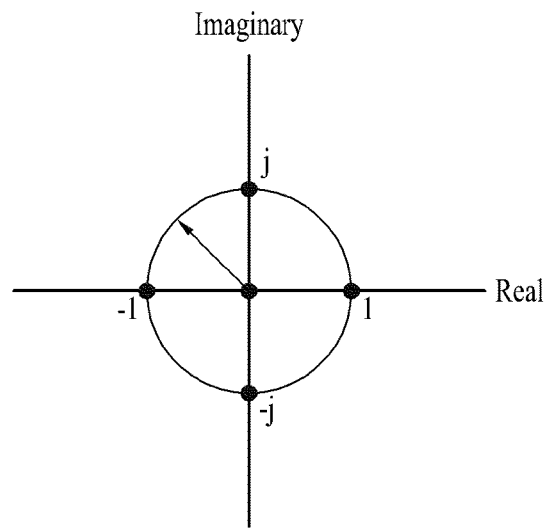
FIG. 19 is a diagram of a conventional QPSK constellation.

FIG. 19 is a diagram of a conventional QPSK constellation, which shows a case that a value of a real or imaginary part is allocated to one user equipment.

Referring to FIG. 19, an HI codeword indicating ACK/NACK for a conventional single codeword transmission is arranged at −1 or 1 on a real axis or −1 or 1 on an imaginary axis (i.e., −j or j). In particular, the HI codeword <0, 0, 0> corresponding to 'HI=0' is arranged at −1. And, the HI codeword <1, 1, 1> corresponding to 'HI=1' is arranged at 1.

Assuming that HI codeword for one user equipment is assigned on one of a real axis and an imaginary axis, 3 positions (in case of Table 11) or 4 positions (in case of Table 12) should be defined on the real or imaginary axis in order to arrange the PHICH statuses shown in Table 11 or Table 12 on a signal constellation.

Figure 20:
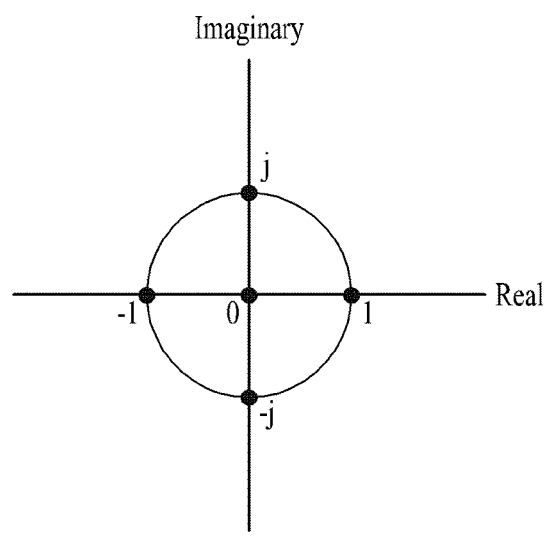
Figure 22:
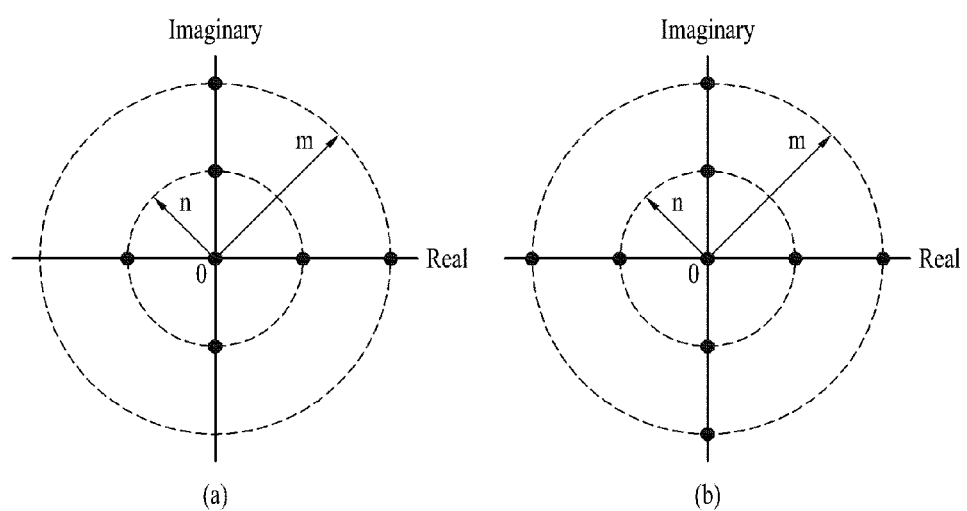

FIGS. 20 to 22 are diagrams for examples of PHICH constellation for representing PHICH statuses more than 2.

Referring to FIG. 20, 0 status is additionally used to represent three PHICH statuses on a signal constellation. Yet, in this case, since a distance between PHICH positions on the signal constellation is reduced into a size equal to one half of the distance shown in FIG. 19, it is disadvantageous in that reliability of PHICH is reduced by 3 dB as well.

Meanwhile, by defining 4 positions on the real axis or 4 positions on the imaginary axis, four PHICH statuses for one user equipment can be arranged on a signal constellation. Referring to FIG. 21, PHICH constellation can be defined by including 0 [FIG. 21 (a), FIG. 21 (b)]. Alternatively, PHICH constellation can be defined by no including 0 [FIG. 21 (c), FIG. 21 (d)].

FIG. 22 (a) shows the generalization of FIG. 21 (a) and FIG. 21 (b). FIG. 22 (b) shows the generalization of FIG. 21 (c) and FIG. 21 (d). Assuming that a value on a real or imaginary axis is allocated as a PHICH resource for one user equipment, one PHICH status is mapped to one of 4 symbols including 0 (e.g., −n, 0, n, m) [FIG. 22 (a)] or one PHICH status is mapped to one of 4 symbols not including 0 (e.g., −m, −n, n, m) [FIG. 22 (b)]. For instance, referring to FIG. 22 (b), if HI codeword is <01, 01, 01>, the modulation block 606-1 is able to map 01 to one of −m, −n, n and m. Since the channel coding block codes 'HI=0' into a codeword of <01, 01, 01> by repetition coding, a position of 01 on the signal constellation can be interpreted as indicating a PHICH status of 01 or can be interpreted as indicating an HI codeword corresponding to the PHICH status.

Meanwhile, a signal constellation used by the modulation block 606-1 can vary in accordance with the number of codewords transmitted by a user equipment. For instance, the modulation block 606-1 arranges PHICH for a transmission of rank-2 or higher on a PHICH constellation according to one of the aforesaid schemes and is also able to arrange PHICH for a rank-1 transmission at −1 or 1 on a real axis or −1 or 1 on an imaginary axis according to a conventional LTE Rel-8 (cf. FIG. 14). In particular, a transmitter 100b of a base station can be configured to enable a PHICH constellation to vary according to a rank. Alternatively, a subset of a PHICH constellation is defined according to a rank and a PHICH constellation subset differing per rank can be used. For instance, a subset of {1, −1} is defined for rank-1, {−n, n, m} is defined for rank-3, and a subset of {−m, −n, n, m} can be previously set for rank-4. In this case, the modulation block 606-1 of the base station is able to arrange PHICH for rank-1, PHICH for rank-3 and PHICH for rank-4 on a PHICH constellation defined as {−1, 1}, a PHICH constellation defined as {−n, n, m} and a PHICH constellation defined as {−m, −n, n, m}, respectively.

According to the present embodiment, a base station is able to assign different PHICH statuses for multiple codewords on different signal constellations, respectively. The base station generates ACK/NACK information on multiple codewords received from a user equipment and then assigns the PHICH statuses indicated by the ACK/NACK information on positions on signal constellation, thereby generating a complex modulation symbol corresponding to the ACK/NACK information. The base station transmits the ACK/NACK information to the user equipment on a PHICH resource determined by an index pair ($n^{group}_{PHICH}$, $n^{seq}_{PHICH}$) for the user equipment after performing the spreading 608, the layer mapping 610 and the resource element mapping 612 on the complex modulation symbol corresponding to the ACK/NACK information.

The user equipment identifies the PHICH resource allocated to the user equipment by the index pair ($n^{group}_{PHICH}$, $n^{seq}_{PHICH}$) and is then able to check the ACK/NACK information on the multiple codewords transmitted by the user equipment based on the positions of the signal, which is received via the PHICH resource, on the signal constellation. For instance, assuming that positions −m, −n, n and m on the signal constellation correspond to $1^{st}$ CW NACK, $2^{nd}$ CW NACK, Both CWs NACK and Both CWs ACK, respectively, if the positions on the signal constellation of the signal received by the user equipment are −m, −n and m, the user equipment can be configured to retransmit a $1^{st}$ codeword, a $2^{nd}$ codeword and both of the two codewords, respectively.

According to the aforesaid embodiment of the HI codeword, a hamming distance between HI codewords is reduced smaller than that of the related art. According to the embodiment of the PHICH constellation, a distance between symbols on a signal constellation is reduced smaller than that of the related art or a higher power should be allocated to each symbol to maintain the same distance. In case that the hamming distance or the symbol distance on the signal constellation is reduced, it is disadvantageous in that PHICH transmission error increases. Since the PHICH is the important information directly connected to an accurate transmission of UL codeword, it should be transmitted to a user equipment as errorless as possible. Therefore, the aforesaid HI codeword embodiment or the aforesaid PHICH constellation embodiment can be defined in a manner of being usable only if a channel status is good.

HI Codeword+PHICH Constellation

Combination of the aforesaid HI codeword embodiment and the aforesaid PHICH constellation embodiment is available. According to the aforesaid HI codeword embodiment, each digit number of the HI codeword is arranged at one of two points on a signal constellation. In this case, 8 (=2×2×2) codewords can be configured as a 3-digit HI codeword. And, the 8 codewords can be arranged at 8 positions on the signal constellation, respectively. Yet, like the PHICH constellation embodiment, in which the respective digits of the HI codeword can be arranged at 3 positions at least, each of the digits of the aforesaid HI codeword can be arranged at one of the at least 3 points on the signal constellation.

For instance, in case that 3 PHICH statuses are mapped to {−1, 0, 1} or {−j, 0, j} on the PHICH constellation, each bit of the HI codeword can be arranged at one point of the {−1, 0, 1} or {−j, 0, j}. In particular, the respective bits of the HI codeword can be discriminated into statuses more than 2 instead of 0 and 1. For instance, assuming that each bit of the HI codeword can include 0, 1 or 2, each PHICH status can be mapped to the following HI codeword for example.

TABLE 18

| HI | HI Codeword <$b_0, b_1, b_2$> | Definition |
|----|-------------------------------|------------|
| 0  | <0, 0, 0>                     | $1^{st}$ CW NACK |
| 1  | <1, 1, 1>                     | $2^{nd}$ CW NACK |
| 2  | <2, 2, 2>                     | Both CWs NACK |
| 3  | <0, 1, 2>                     | Both CWs ACK |

Assuming that 0, 1 and 2 in the HI codeword are arranged at −1, 0 and 1 on the signal constellation, respectively, the modulation mapper 606-1 is able to modulate the HI codeword <0, 1, 2> into <−1, 0, 1> in a manner of arranging 0, 1 and 2 to −1, 0 and 1, respectively, for example.

The base station transmits the complex modulation symbol to the user equipment via the PHICH resource determined by the index pair ($n^{group}_{PHICH}$, $n^{seq}_{PHICH}$) for the user equipment after performing the spreading 608, the layer mapping 610 and the resource element mapping 612 for the complex modulation symbol.

The user equipment identifies the PHICH resource allocated to the user equipment by the index pair ($n^{group}_{PHICH}$, $n^{seq}_{PHICH}$) and then demodulates the position on the signal constellation of the signal received via the PHICH resource. Moreover, the user equipment reconstructs the HI codeword into the HI corresponding to the HI codeword through the channel decoding. Since the HI indicates one of the PHICH statuses, the user equipment is able to check or confirm the ACK/NACK information on the multiple codewords having been transmitted to the base station by the user equipment.

Thus, in case that the HI codeword embodiment and the PHICH constellation embodiment are used by being combined together, since the respective digits of the 3-digit HI codeword can be arranged at three positions on the signal constellation, respectively, 27 (=3×3×3) combinations are usable in representing the PHICH statuses. A prescribed number of codewords for reducing the PHICH transmission error are selected from the 27 HI codewords to construct PHICH for multiple codewords. For instance, if the hamming distances of the 27 codewords and/or the positions on the signal constellation are taken into consideration, it can be used to indicate 3 (in case of Table 11) or 4 (in case of Table 12) PHICH statuses having distant hamming distances or distant positions on the signal constellation.

The number of the HI codewords used by the present embodiment can vary in accordance with a rank. For instance, for the rank-1 transmission, HI codeword for discriminating 2 PHICH statuses, as shown in Table 3, is used. For another instance, for rank-2 or higher, HI codeword indicating 3 or 4 PHICH statuses can be used. In particular, in case of the rank-1, it is able to define that subsets <0, 0, 0> and <1, 1, 1> of the HI codewords used for the rank-4 or higher are used.

The user equipment can be aware of a presence or non-presence of successful transmission of the multiple codeword transmitted by the user equipment and a presence or non-presence of necessity for retransmission, based on the position on the signal constellation of the received PHICH and/or the HI codeword reconstructed from the PHICH.

According to the aforesaid PHICH constellation embodiment and/or the aforesaid HI codeword embodiment, operations of the spreading block 608, the layer mapping block 610 and the resource mapping block 612 are described with reference to FIG. 14, the corresponding details shall be omitted from the following description.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The embodiments of the present invention can be applied to a base station, a mobile station, or other communication devices in a wireless communication system.

What is claimed is:

1. A method of receiving, by a user equipment, ACK/NACK (acknowledgement/negative ACK) information from a base station in a wireless communication system, comprising:
    transmitting, by the user equipment, two codewords via a prescribed frequency resource; and
    receiving, by the user equipment, the ACK/NACK information for the two codewords via a PHICH (physical hybrid ARQ channel),
    wherein the received ACK/NACK information indicates that both of the two codewords are ACK when the received ACK/NACK information is corresponding to null information,
    wherein the received ACK/NACK information indicates at least that both of the two codewords are NACK or that one of the two codewords is NACK, when the received ACK/NACK information is an HI (HARQ indicator) codeword.

2. The method of claim 1, wherein the received ACK/NACK information indicates that both of the two codewords are NACK when the HI codeword, <b0, b1, b2>, is <0, 0, 0>, and the received ACK/NACK information indicates that one of the two codewords is NACK when the HI codewords, <b0, b1, b2>, is <1, 1, 1>.

3. The method of claim 1, further comprising:
    flushing buffers for the two codewords when the received ACK/NACK information is corresponding to null information; and
    maintaining the buffers for the two codewords when the received ACK/NACK information indicates that both of the two codewords are NACK.

4. The method of claim 3, wherein the buffers for the two codewords are maintained even when toggled NDIs (new data indicators) for the two codewords are received.

5. A user equipment for receiving ACK/NACK (acknowledge/negative ACK) from a base station in a wireless communication system, the user equipment comprising:
    a transmitter configured to transmit two codewords via a prescribed frequency resource;
    a receiver; and
    a processor configured to control the transmitter and the receiver, the processor configured to control the receiver to receive ACK/NACK information for the two codewords via a PHICH (physical hybrid ARQ channel),
    wherein the received ACK/NACK information indicates that both of the two codewords are ACK when the received ACK/NACK information is corresponding to null information,
    wherein the received ACK/NACK information indicates at least that both of the two codewords are NACK or that one of the two codewords is NACK, when the received ACK/NACK information is an HI (hybrid ARQ indicator) codeword.

6. The user equipment of claim 5, wherein the received ACK/NACK information indicates that both of the two codewords are NACK when the HI codeword, <b0, b1, b2>, is <0, 0, 0>, and the received ACK/NACK information indicates that one of the two codewords, <b0, b1, b2>, is NACK when the HI codewords is <1, 1, 1>.

7. The user equipment of claim 5, wherein the processor is configured to flush buffers for the two codewords when the received ACK/NACK information is corresponding to null information; and maintain the buffers for the two codewords when the received ACK/NACK information indicates that both of the two codewords are NACK.

8. The user equipment of claim 7, wherein the buffers for the two codewords are maintained even when the receiver receives toggled NDIs (new data indicators) for the two codewords.

9. A method of transmitting, by a base station, ACK/NACK (acknowledgement/negative ACK) to a user in a wireless communication system, comprising:
receiving two codewords from the user equipment via a prescribed frequency resource;
transmitting an HI (hybrid ARQ indicator) codeword as ACK/NACK information for the two codewords via a PHICH (physical hybrid ARQ channel) when both of the two codewords are NACK or when one of the codewords is NACK and dropping transmission of the ACK/NACK information for the two codewords via the PHICH when both of the two codewords are ACK,
wherein the HI codeword indicates at least that both of the two codewords are NACK or that one of the two codewords is NACK.

10. The method of claim 9, wherein the HI codeword, <b0, b1, b2>, is set to <0, 0, 0> when both of the two codewords are NACK, and the HI codeword, <b0, b1, b2>, is set to <1, 1, 1> when one of the two codewords is NACK.

11. A base station for transmitting ACK/NACK (acknowledgement/negative ACK) to a user equipment in a wireless communication system, the base station comprising:
a receiver configured to receive two codewords from the user equipment via a prescribed frequency resource;
a transmitter; and
a processor configured to control the transmitter and the receiver, the processor configured to control the transmitter to transmit an HI (hybrid ARQ indicator) codeword as ACK/NACK information for the two codewords via a PHICH (physical hybrid ARQ channel) when both of the two codewords are NACK or when one of the codewords is NACK and dropping transmission of the ACK/NACK information for the two codewords via the PHICH when both of the two codewords are ACK,
wherein the HI codeword indicates at least that both of the two codewords are NACK, or that one of the two codewords is NACK.

12. The base station of claim 11, wherein the HI codeword, <b0, b1, b2>, is set to <0, 0, 0> when both of the two codewords are NACK, and the HI codeword, <b0, b1, b2>, is set to <1, 1, 1> when one of the two codewords is NACK.

* * * * *